US012792735B2

United States Patent
(12) United States Patent
Lee et al.

(10) Patent No.: US 12,792,735 B2
(45) Date of Patent: Nov. 10, 2026

(54) STORAGE DEVICE AND AN OPERATION METHOD OF A STORAGE CONTROLLER INCLUDED THEREIN

(71) Applicant: SAMSUNG ELECTRONICS CO., LTD., Suwon-si (KR)

(72) Inventors: Wijik Lee, Suwon-si (KR); Sungkyu Park, Suwon-si (KR); Jiyoup Kim, Suwon-si (KR); Bohwan Jun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/785,633

(22) Filed: Jul. 26, 2024

(65) Prior Publication Data

US 2025/0209173 A1 Jun. 26, 2025

(30) Foreign Application Priority Data

Dec. 26, 2023 (KR) ........................ 10-2023-0191463

(51) Int. Cl.
*G06F 21/56* (2013.01)
*G06F 11/10* (2006.01)

(52) U.S. Cl.
CPC ........ *G06F 21/568* (2013.01); *G06F 11/1068* (2013.01); *G06F 21/566* (2013.01)

(58) Field of Classification Search
CPC ... G06F 21/568; G06F 11/1068; G06F 21/566
See application file for complete search history.

(56) References Cited

U.S. PATENT DOCUMENTS 8,301,810 B2 10/2012 Pang et al.
9,632,870 B2 4/2017 Bennett
10,609,066 B1 * 3/2020 Nossik ................ H04L 63/1408
11,113,156 B2 9/2021 Brewer et al.
11,223,479 B1 1/2022 Firestone et al.
11,645,162 B2 5/2023 Huskisson et al.
11,657,146 B2 5/2023 Miller et al.
11,704,053 B1 * 7/2023 Tal ........................ G06F 3/0689 711/114
2006/0136666 A1 6/2006 Pang et al.
(Continued)

OTHER PUBLICATIONS

Sungha Baek, et al. "SSD-assisted Ransomware Detection and Data Recovery Techniques", IEEE Transactions on Computers & vol. 70, Issue: 10, Oct. 1, 2021, 1762-1776.

*Primary Examiner* — Linglan Edwards
*Assistant Examiner* — Jacob Benedict Knackstedt
(74) *Attorney, Agent, or Firm* — MORGAN, LEWIS & BOCKIUS LLP

(57) ABSTRACT

A storage device including: a non-volatile memory device that includes a first stripe including a victim memory block and a plurality of striping memory blocks associated with the victim memory block, and a second stripe including a decoy memory block; and a memory controller configured to: identify a victim page within the victim memory block based on physical address history information stored in a decoy page within the decoy memory block; generate recovery data based on a plurality of striping pages, each included in the plurality of striping memory blocks, wherein the plurality of striping pages correspond to the victim page; and program the recovery data into the victim page.

18 Claims, 26 Drawing Sheets

(56) References Cited

U.S. PATENT DOCUMENTS

| | | | | |
|---|---|---|---|---|
| 2011/0126045 | A1 | 5/2011 | Bennett | |
| 2018/0059937 | A1* | 3/2018 | Kim | G11C 16/10 |
| 2019/0004972 | A1* | 1/2019 | Bear | G06F 12/145 |
| 2019/0235973 | A1* | 8/2019 | Brewer | G06F 11/1469 |
| 2020/0125488 | A1* | 4/2020 | Byun | G06F 12/10 |
| 2021/0152595 | A1* | 5/2021 | Hansen | G06F 21/568 |
| 2021/0191808 | A1* | 6/2021 | Bhardwaj | G06F 11/1068 |
| 2021/0216408 | A1 | 7/2021 | Huskisson et al. | |
| 2021/0334200 | A1* | 10/2021 | Xu | G06F 13/4221 |
| 2022/0245241 | A1 | 8/2022 | Miller et al. | |
| 2022/0300413 | A1* | 9/2022 | Kannan | G06F 3/0652 |
| 2024/0036741 | A1* | 2/2024 | Yun | G06F 3/0659 |
| 2024/0061785 | A1* | 2/2024 | Suzuki | G06F 12/0868 |

* cited by examiner

FIG. 11

AMT

| | Validity | Logical address (LA) | Physical address (PA) |
|---|---|---|---|
| MI1 | Invalid → Valid | LA1 | VPG1 |
| MI2 | Valid | LA2 | VPG2 |
| MI3 | Valid | LA3 | VPG3 |
| | ⋮ | ⋮ | ⋮ |
| MIm | Valid → Invalid | LA1 | DPG1 |

"Validate mapping for victim page"

"invalidate mapping for decoy page"

STORAGE DEVICE AND AN OPERATION METHOD OF A STORAGE CONTROLLER INCLUDED THEREIN

CROSS-REFERENCE TO RELATED APPLICATION

This application claims priority under 35 U.S.C. § 119 to Korean Patent Application No. 10-2023-0191463 filed in the Korean Intellectual Property Office on Dec. 26, 2023, the disclosure of which is incorporated by reference herein in its entirety.

(a) TECHNICAL FIELD

The present disclosure relates to a semiconductor memory device. More specifically, the present disclosure relates to a storage device configured to recover falsified data irrespective of a user's intention, along with an operational method of an included memory controller.

(b) DESCRIPTION OF THE RELATED ART

Ransomware may falsify victim data stored on a storage device without a user's intent. For example, ransomware may manipulate a memory controller arbitrarily and create decoy data by altering the raw data stored in a non-volatile memory device. As a result, the user may lose access to the raw data.

Storage devices can be designed to protect against data damage using various methods. For example, a storage device may store raw data and its backup data in different memory regions, effectively mirroring the raw data. In this way, even if the raw data is damaged, the storage device can recover it using the backup data. However, implementing the storage device to back up all raw data can require an excessively large amount of storage space for the backup data.

SUMMARY

Embodiments of the present disclosure provide a storage device configured to recover data using a smaller storage space and an operation method of the memory controller included within.

An embodiment of the present disclosure provides a storage device including: a non-volatile memory device that includes a first stripe including a victim memory block and a plurality of striping memory blocks associated with the victim memory block, and a second stripe including a decoy memory block; and a memory controller configured to: identify a victim page within the victim memory block based on physical address history information stored in a decoy page within the decoy memory block; generate recovery data based on a plurality of striping pages, each included in the plurality of striping memory blocks, wherein the plurality of striping pages correspond to the victim page; and program the recovery data into the victim page.

An embodiment of the present disclosure provides an operation method of a memory controller configured to control a non-volatile memory device including: detecting a ransomware attack on the non-volatile memory device; identifying a victim memory block subject to the ransomware attack; determining whether a garbage collection has been executed on the victim memory block after the ransomware attack; recovering the victim memory block by validating invalid data stored in the victim memory block when the garbage collection has not performed after the ransomware attack; and recovering the victim memory block by performing a recovery decoding based on a first stripe that includes the victim memory block when the garbage collection has been performed after the ransomware attack.

An embodiment of the present disclosure provides a storage device including: a plurality of data memory blocks including a victim memory block; a first parity memory block configure to store first parity data generated based on a plurality of raw data respectively stored in the plurality of data memory blocks at a first time point when each of the plurality of data memory blocks is in a fully-occupied state; a decoy memory block configured to store decoy data generated based on first raw data stored in the victim memory block at a second time point after the first time point, wherein the first raw data is one of the plurality of raw data; and a memory controller configured to generate first recovery data corresponding to the first raw data, when the victim memory block is erased at the third time point after the second time point, based on the first parity data and the rest of the raw data, except the first raw data, from among the plurality of raw data, at a fourth time point after a third time point.

BRIEF DESCRIPTION OF THE DRAWINGS

FIG. 11 shows a method for recovering the victim data of FIG. 9 in more detail.

DETAILED DESCRIPTION OF THE EMBODIMENTS

Hereinafter, embodiments of present disclosure will be described clearly and in detail, enabling a person of ordinary skill in the art to easily implement the disclosure. Details such as configurations and structures are provided to facilitate an overall understanding of the embodiments. Modifications to the described embodiments can be made by a person of an ordinary skill in the art without departing from the technical spirit and scope of the present disclosure. Furthermore, descriptions of well-known functions and structures are omitted for clarity and brevity. Components in the following drawings or detailed description may be connected to other components not shown or described. Terms used in this text are defined based on the functions of the present disclosure and are not limited to specific functions. Definitions of terms can be determined from the details provided in the detailed description.

Components referred to by terms such as driver or block in the detailed description may be implemented in the form of software, hardware, or a combination of both. For example, software may include machine code, firmware, embedded code, and application software. For example, hardware may include electrical circuits, electronic circuits, processors, computers, integrated circuit cores, pressure sensors, inertial sensors, micro electro mechanical systems (MEMS), passive elements, or combinations thereof.

Figure 1:
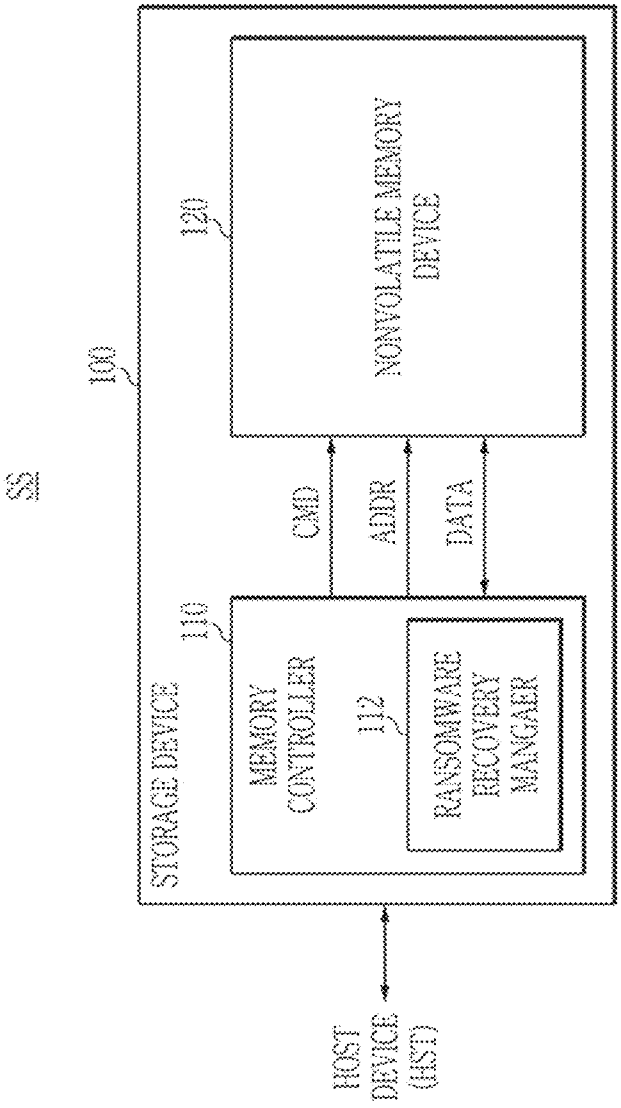
FIG. 1 is a block diagram of a storage system according to an embodiment of the present disclosure.

FIG. 1 is a block diagram of a storage system according to an embodiment of the present disclosure. Referring to FIG. 1, a storage system SS may include a host device HST and a storage device 100.

The host device HST may access the storage device 100. For example, the host device HST may store data in the storage device 100 or read data stored in the storage device.

In an embodiment, the host device HST may be infected with ransomware. In this case, the host device HST may execute a ransomware attack on the storage device 100, irrespective of the legitimate user's intention. For example, the host device HST may access the storage device 100 and generate decoy data by falsifying (e.g., altering) raw data stored in the storage device 100. The operation of the storage device 100 in response to the control of the host device HST infected with ransomware will be described in more detail with reference to FIG. 6 to FIG. 8.

The storage device 100 may include a memory controller 110 and a non-volatile memory device 120. The memory controller 110 may store data DATA in the non-volatile memory device 120 or read data DATA stored in the non-volatile memory device 120. For example, the memory controller 110 transmits a command CMD and/or an address ADDR to the non-volatile memory device 120, and stores data DATA in the non-volatile memory device 120 or reads data DATA stored in the non-volatile memory device 120.

The memory controller 110 may include a ransomware recovery manager 112. The ransomware recovery manager 112 may detect ransomware attacks on the storage device 100. In this case, the ransomware recovery manager 112 may recover data falsified by the ransomware attack. For example, the ransomware recovery manager 112 may identify decoy data generated by the ransomware attack and restore the original raw data to its state before it was falsified. The detailed configuration and operation of the ransomware recovery manager 112 will be described in more detail with reference to the following drawings. Components of the ransomware recovery manager 112 may be implemented in hardware, software, and/or combinations thereof.

Hereinafter, it is assumed that the non-volatile memory device 120 is a flash memory device and the storage device 100 is a solid-state drive SSD. However, the present disclosure is not limited thereto.

Figure 2:
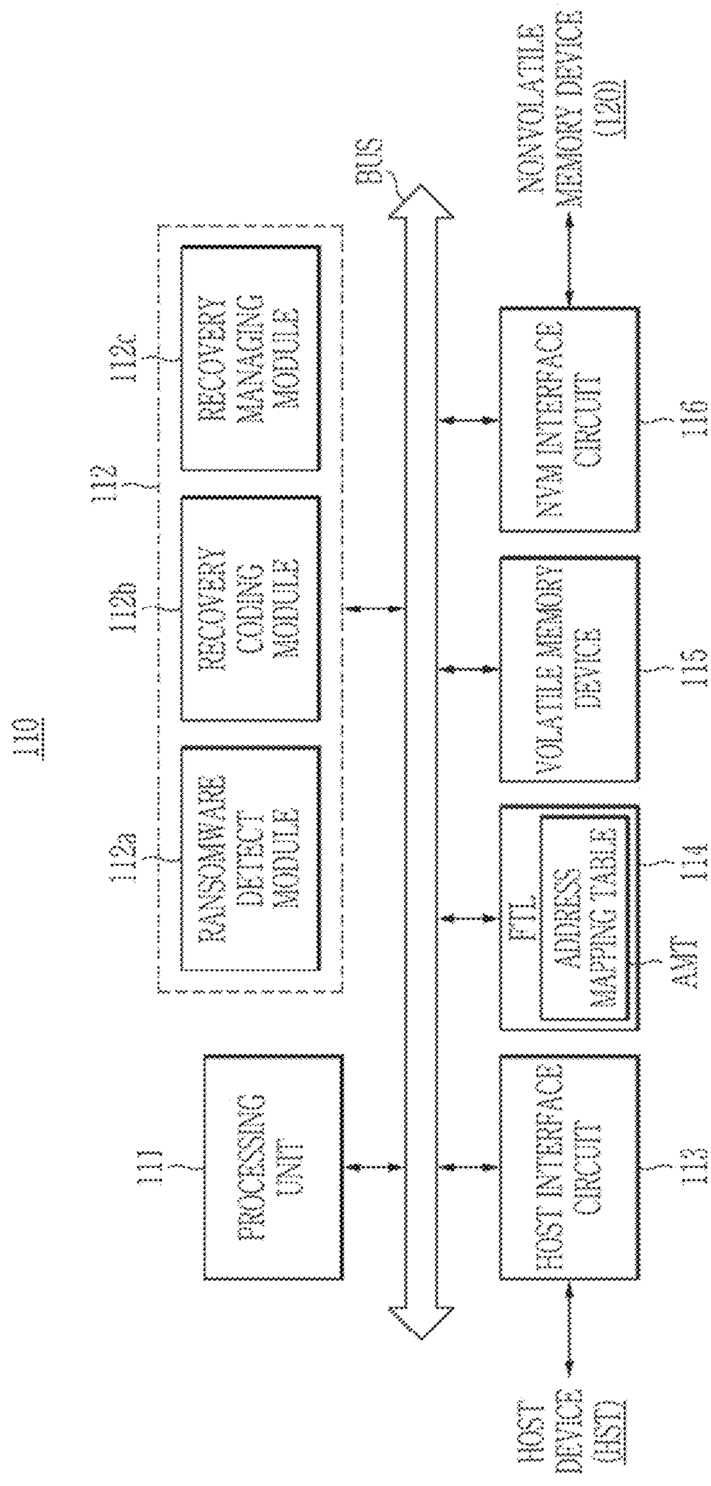
FIG. 2 is a block diagram that shows the memory controller of FIG. 1 in detail.

FIG. 2 is a block diagram that shows the memory controller of FIG. 1 in detail. Referring to FIG. 1 to FIG. 2, the memory controller 110 may include a processing unit 111, a ransomware recovery manager 112, a host interface circuit 113, a flash translation layer (FTL) 114, a volatile memory device 115, and a non-volatile memory interface circuit 116. The processing unit 111, the ransomware recovery manager 112, the host interface circuit 113, the flash translation layer 114, the volatile memory device 115, and the non-volatile memory interface circuit 116 may be connected with each other through a bus BUS.

The processing unit 111 may control the overall operations of the memory controller 110. For example, the processing unit 111 may execute various types of programs, applications, and firmware that run on the memory controller 110.

The memory controller 110 may communicate with the host device HST through the host interface circuit 113. For example, the host interface circuit 113 may communicate with the host device HST based on at least one of a peripheral component interconnect express (PCI-express) interface, a nonvolatile memory express (NVMe) interface, a serial ATA (SATA) interface, a serial attached SCSI (SAS) interface, a universal flash storage (UFS) interface, and the like.

The flash translation layer 114 may include an address mapping table AMT. The address mapping table AMT may store mapping information between a logical address managed by the host device HST and a physical address managed by the storage device 100. The flash translation layer 114 may perform various operations to efficiently utilize the non-volatile memory device 120 based on the address mapping table AMT. For example, the flash translation layer 114 can carry out functions such as address mapping, garbage collection (GC), wear leveling, and other related tasks based on the address mapping table AMT.

In an embodiment, the garbage collection may refer to the process of copying invalid data from a memory block in the non-volatile memory device 120 to another memory block, followed by erasing the original memory block. A more detailed description of how garbage collection is performed will be described in more detail with reference to FIG. 21 to FIG. 23.

In an embodiment, the flash translation layer 114 may be implemented in software or hardware. When the flash translation layer 114 is implemented in software, a program code or information related to the flash translation layer 114 may be stored in the volatile memory device 115 and executed by the processing unit 111. When the flash translation layer 114 is implemented in hardware, a hardware accelerator configured to perform the function of the flash translation layer 114 may be provided separately from the processing unit 111.

The volatile memory device 115 may be used as a buffer memory, an operation memory, or a cache memory of the memory controller 110. For example, the volatile memory device 115 may store various types of temporary data used in operations such as programs, applications, and firmware executed by the processing unit 111.

In an embodiment, the volatile memory device 115 may be implemented using a static random access memory (SRAM) device, a dynamic random access memory (DRAM) device, and/or a combination of both. However, the present disclosure is not limited thereto.

The memory controller 110 may control the non-volatile memory device 120 through the non-volatile memory interface circuit 116. For example, the non-volatile memory interface circuit 116 may communicate with the non-volatile memory device 120 using a NAND interface.

The ransomware recovery manager 112 may include a ransomware detect module 112*a*, a recovery coding module 112*b*, and a recovery managing module 112*c*. Each of the ransomware detect module 112*a*, the recovery coding module 112*b*, and the recovery managing module 112*c* may be implemented in hardware, software, and/or combinations thereof.

The ransomware detect module 112*a* may detect ransomware attacks from the host device HST. For example, the ransomware detect module 112*a* may infer whether the host device HST is infected with ransomware based on an operation log or an operation flow of the memory controller 110 under the control of the host device HST. Hereafter, it will be described that the ransomware detection module 112*a* is included in the memory controller 110, but the present disclosure is not limited thereto. For example, the ransomware detect module 112*a* may be implemented as software running on the host device HST, or may be implemented as firmware running on the memory controller 110. In other words, the scope of the present disclosure is not limited to the specific method used by the ransomware detection module 112*a* to detect a ransomware attack.

The recovery coding module 112*b* may generate parity data by performing a recovery encoding operation based on various types of coding algorithms. For example, the recovery coding module 112*b* may generate parity data based on the plurality of raw data stored in the non-volatile memory device 120. In this case, the recovery coding module 112*b* may control the non-volatile memory interface circuit 116 and store the generated parity data in the non-volatile memory device 120.

Conversely, the recovery coding module 112*b* may generate recovery data by performing a recovery decoding operation based on various types of coding algorithms. For example, the recovery coding module 112*b* may perform a recovery decoding operation to generate recovery data based on the plurality of raw data and parity data stored in the non-volatile memory device 120. The recovery encoding and recovery decoding operations will be described in more detail with reference to FIG. 5 to FIG. 15.

In an embodiment, the recovery coding module 112*b* may perform recovery encoding and decoding operation based on various types of coding algorithms such as XOR coding, Reed-Solomon coding, erasure coding, and the like. For a more concise description, an embodiment in which the recovery coding module 112*b* performs a recovery encoding and decoding operation using the XOR coding algorithm will be representatively described. However, the scope of the present disclosure is not limited to the type of coding algorithm used by the recovery coding module 112*b*.

The recovery managing module 112*c* may control overall operations of the ransomware recovery manager 112. For example, when the ransomware detect module 112*a* detects a ransomware attack, the recovery managing module 112*c* may recover raw data falsified by ransomware using various methods. A method by which raw data falsified by ransomware is recovered by the recovery managing module 112*c* will be described in more detail with reference to the drawings below.

Figure 3:
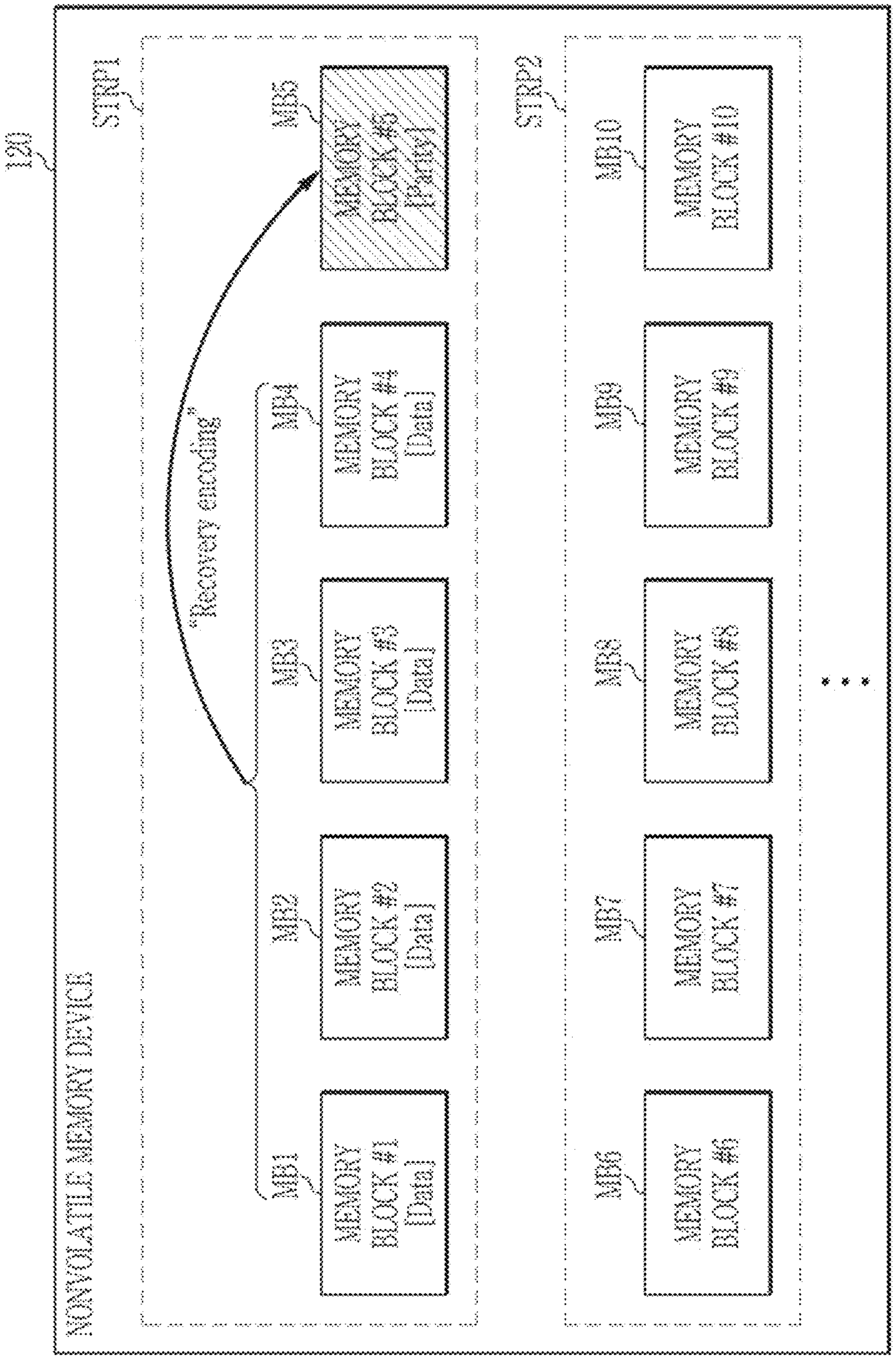
FIG. 3 is a block diagram of the non-volatile memory device of FIG. 1.

FIG. 3 is a block diagram of the non-volatile memory device of FIG. 1. Referring to FIG. 1 to FIG. 3, the non-volatile memory device 120 may include a plurality of stripes STRP. For example, the non-volatile memory device 120 may include a first stripe STRP1 and a second stripe STRP2. Hereinafter, the composition and function of the first stripe STRP1 and the second stripe STRP2 among the plurality of stripes STRP will be representatively described.

Each of the plurality of stripes STRP may include a plurality of memory blocks MB. For example, the first stripe STRP1 may include first, second, third, fourth and fifth memory blocks MB1, MB2, MB3, MB4 and MB5. The second stripe STRP2 may include sixth, seventh, eighth, ninth and tenth memory blocks MB6, MB7, MB8, MB9 and MB10. However, the scope of the present disclosure is not limited to the number of memory block MB included in each stripe STRP.

Recovery coding (e.g., recovery encoding and recovery decoding) for the plurality of memory blocks MB may be performed on a stripe STRP unit basis. For example, recovery coding for memory blocks MB included in the first stripe STRP1 may be performed independently from recovery coding for the memory blocks MB included in the second stripe STRP2. In other words, a stripe STRP may refer to a set of plurality of memory blocks MB where recovery coding is performed independently.

One or more of the plurality of memory blocks MB included in one stripe STRP may be used as a parity memory block. Among the plurality of memory blocks MB included in one stripe STRP, memory blocks that are not parity memory blocks may be used as data memory blocks. For a more concise description, an embodiment in which one parity memory block is included in one stripe STRP will be representatively described. An embodiment in which a plurality of parity memory blocks are included in one stripe STRP will be described in more detail with reference to FIG. 24 to FIG. 25.

One of the memory blocks MB included in the first stripe STRP1 may be used as a parity memory block. For example, the fifth memory block MB5 may be used a parity memory block for the first stripe STRP1.

Among the memory blocks MB included in the first stripe STRP1, the remaining memory blocks, except for the fifth memory block MB5, may be used as data memory block. For example, each of the first to fourth memory blocks MB1 to MB4 may be used as a data memory block.

Each data memory block may store raw data. For example, each of the first to fourth memory blocks MB1 to MB4 may store raw data provided from the host device HST.

The parity memory block may store parity data. The parity data may be data generated by the memory controller 110. In other words, parity data may not be data provided from the host device HST. For example, parity data may be generated by the memory controller 110 based on the plurality of raw data stored in each plurality of data memory blocks. More specifically, the recovery coding module 112*b* may generate parity data by performing a recovery coding operation based on row data stored in each of the first to fourth memory blocks MB1 to MB4, and then store the generate parity data in the fifth memory block MB5. The method for performing the recovery coding operation will be described in more detail with reference to FIG. 4 and FIG. 5.

In a similar manner, each of the plurality of stripes STRPs included in the non-volatile memory device 120 may include a plurality of data memory blocks and one or more parity memory blocks.

In an embodiment, parity data may be generated when all data memory blocks included in a stripe STRP that corresponds to the parity memory block are fully-occupied. For example, the recovery coding module 112*b* may generate parity data when the first to fourth memory blocks MB1 to MB4 are fully occupied, and store the generated parity data in the fifth memory block MB5. However, the scope of present disclosure is not limited to this example.

In an embodiment, when all pages included in a certain memory block are in a programmed state (e.g., when all pages are occupied), the corresponding memory block may be referred to as being in a fully occupied state. However, the scope of present disclosure is not limited thereto.

Figure 4:
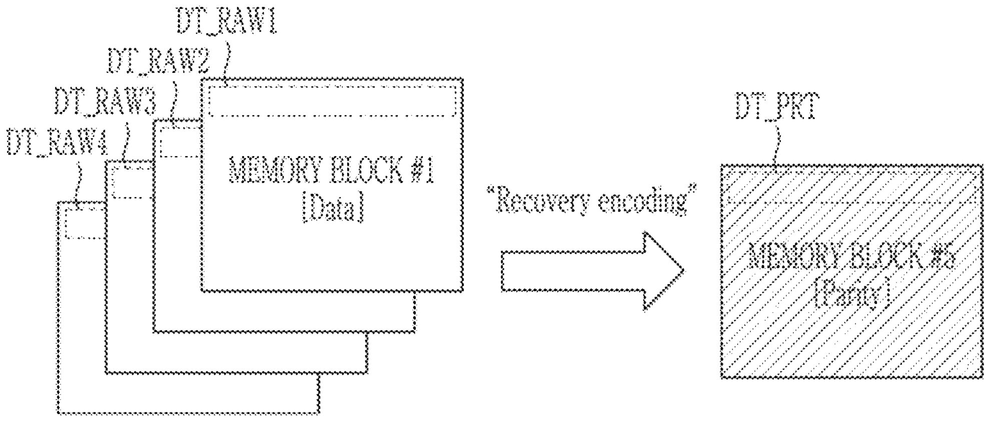
FIG. 4 shows how the recovery encoding of FIG. 3 is performed.

FIG. 4 shows how the recovery encoding of FIG. 3 is performed. Hereinafter, referring to FIG. 1 to FIG. 4, recovery encoding for the memory blocks MB included in the first stripe STRP1 will be representatively described. However, the present disclosure is not limited thereto, and recovery encoding for other stripe STRPs included in the non-volatile memory device 120 may also be performed in a similar manner.

Each data memory block included in the first stripe STRP1 may store different raw data. For example, the first memory block MB1 to the fourth memory block MB4 may respectively store first raw data DT_RAW1, second raw data DT_RAW2, third raw data DT_RAW3 and fourth raw data DT_RAW4.

The recovery coding module 112*b* may perform a recovery encoding operation using the first to fourth raw data DT_RAW1 to DT_RAW4, and generate parity data DT_PRT for the first to fourth raw data DT_RAW1 to DT_RAW4. After that, the recovery coding module 112*b* may store the parity data DT_PRT in a parity memory block (e.g., fifth memory block MB5) for the first stripe STRP1.

In an embodiment, the first to fourth raw data DT_RAW1 to DT_RAW4 may each be stored in positions corresponding to each other. For example, the positions where the first memory block MB1 to the fourth memory block MB4 store the first to fourth raw data DT_RAW1 to DT_RAW4, respectively, may correspond to each other. More specifically, the position within the first memory block MB1 of a page where the first raw data DT_RAW1 is stored may correspond to the position within the second memory block MB2 of a page where second raw data DT_RAW2 is stored. However, the present disclosure is not limited thereto.

In an embodiment, the parity data DT_PRT may be stored in a position corresponding to the raw data used to generate the parity data DT_PRT. For example, the position where the parity data DT_PRT is stored may correspond to the position where the first to fourth raw data DT_RAW1 to DT_RAW4 are stored. More specifically, the position in the fifth memory block MB5 of the page where the parity data DT_PRT is stored may correspond to the position in the first memory block MB1 of the page where the first raw data DT_RAW1 is stored. However, the present disclosure is not limited thereto.

Figure 5:
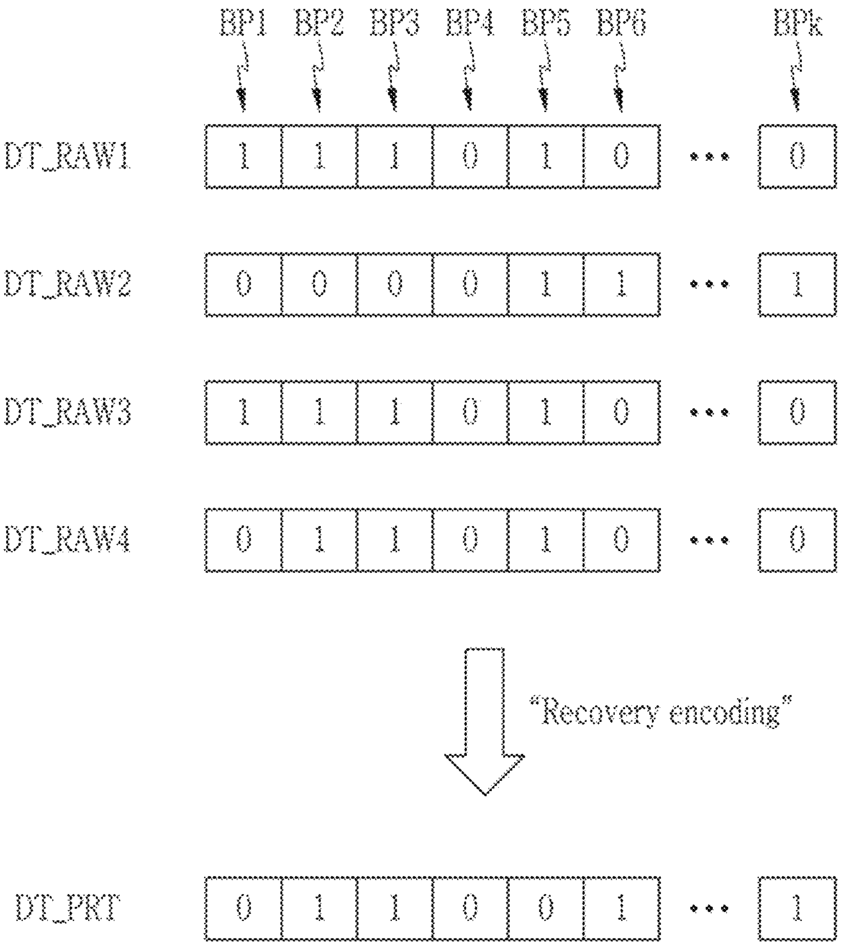
FIG. 5 shows how the recovery encoding of FIG. 4 is performed in more detail.

FIG. 5 shows how the recovery encoding of FIG. 4 is performed in more detail. Referring to FIG. 1 to FIG. 5, the first to fourth raw data DT_RAW1 to DT_RAW4 each may include plurality of different bits.

The recovery coding module 112*b* may generate the parity data DT_PRT by performing an XOR operation for each bit position BP of the first to fourth raw data DT_RAW1 to DT_RAW4. For example, the recovery coding module 112*b* may generate the parity data DT_PRT by performing the XOR operation on bits located in the same bit position BP of each of the first to fourth raw data DT_RAW1 to DT_RAW4.

More specifically, the recovery coding module 112*b* may perform the XOR operation on bits included in a first bit position BP1 of the first to fourth raw data DT_RAW1 to DT_RAW4 to calculate the bit in the first bit position BP1 of the parity data DT_PRT. For example, "1", "0", "1", and "0" bits may be included in each of the first bit positions BP1 of the first to fourth raw data DT_RAW1 to DT_RAW4. In this case, the recovery coding module 112*b* performs a "$1\oplus0\oplus0$" calculation (where $\oplus$ represents the XOR operator) to calculate the "0" bit for the first bit position BP1 of the parity data DT_PRT. Similarly, the recovery coding module 112*b* may perform the "$1\oplus0\oplus1\oplus1$" calculation to calculate the "1" bit for a second bit position BP2 of the parity data DT_PRT. In this way, the recovery coding module 112*b* can calculate each of the bits included in the first to k-th bit position BP1 to BPk of the parity data DT_PRT.

For a more concise description, FIG. 5 illustrates an embodiment in which the recovery coding module 112*b* generates the parity data DT_PRT through the XOR operation. However, the present disclosure is not limited thereto. For example, the recovery coding module 112*b* may generate the parity data DT_PRT using various types of coding methods, such as the erasure coding or the Reed-Solomon coding. In other words, the present disclosure is not limited to the specific coding method used by the recovery coding module 112*b*.

Figure 6:
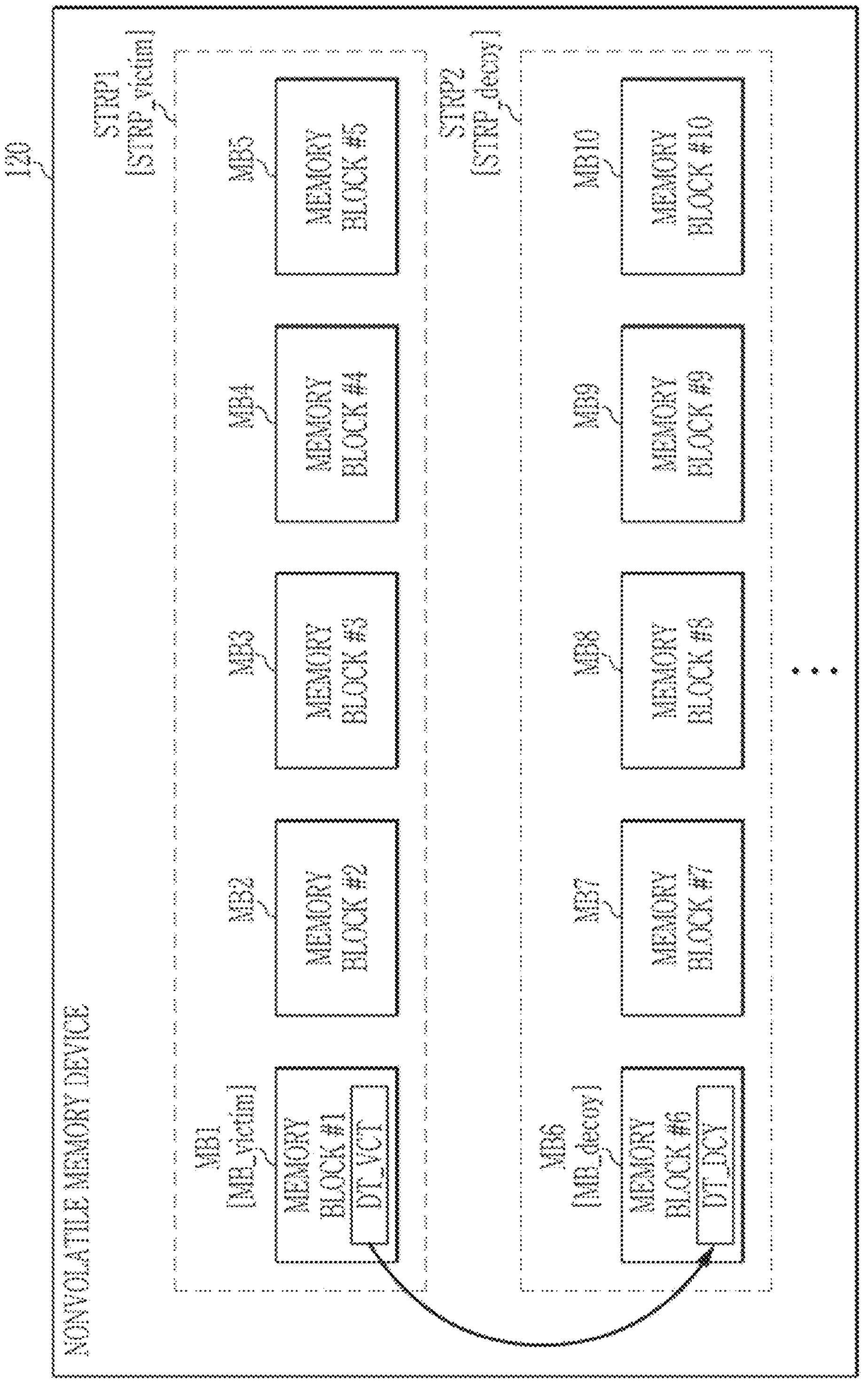
FIGS. 6, 7 and 8 show how a ransomware attack on the storage device is performed.
Figure 7:
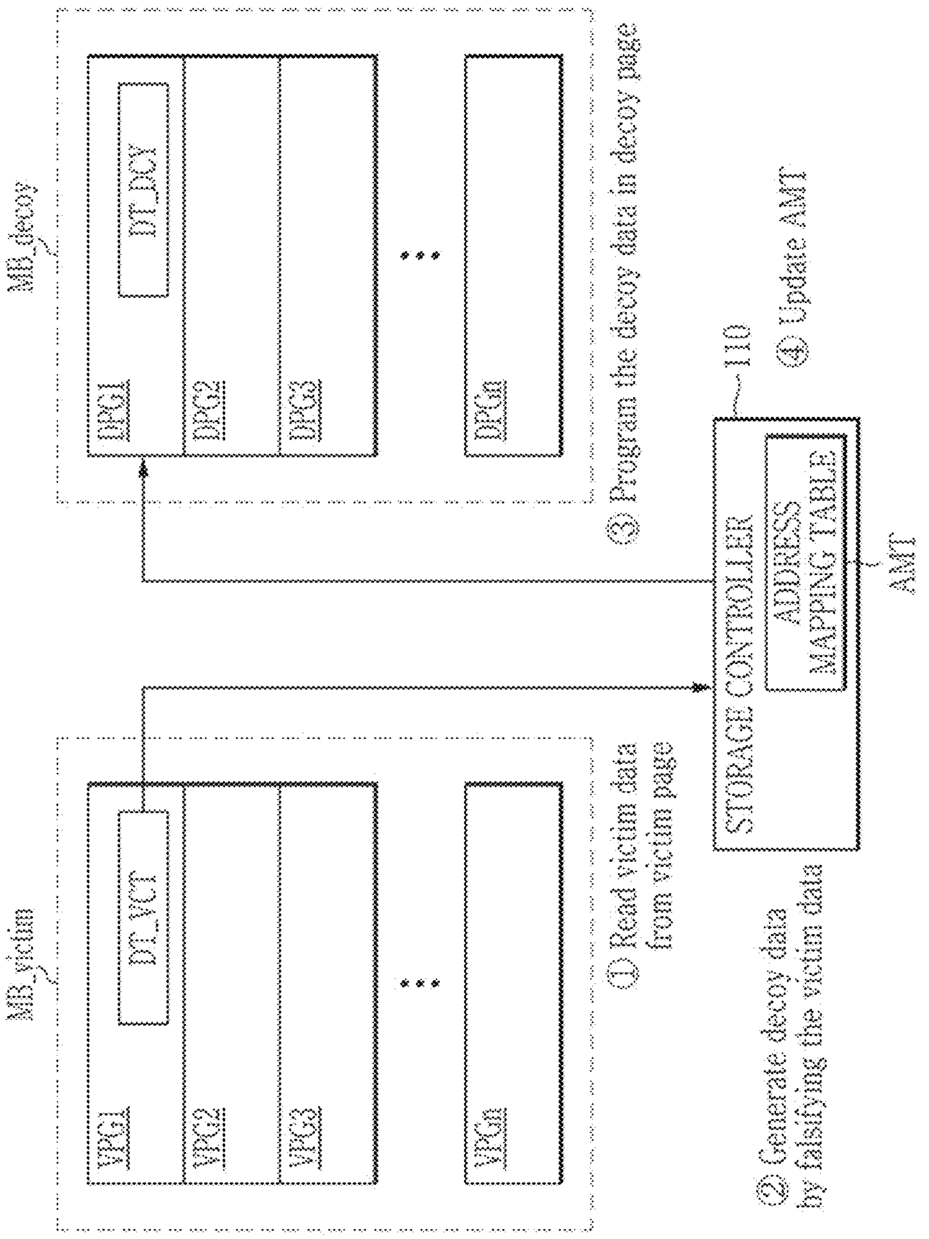
Figure 8:
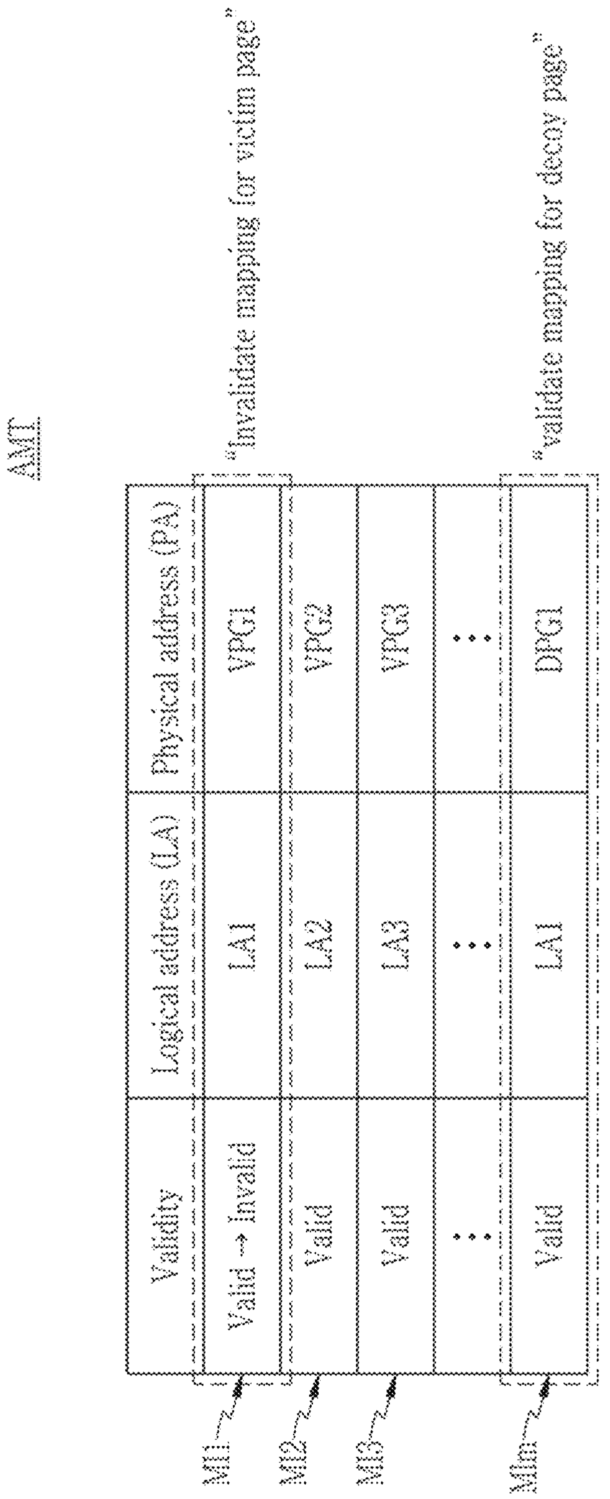

FIG. 6 to FIG. 8 show how a ransomware attack for the storage device is performed. The process by which the host device HST becomes infected with ransomware and falsifies data stored in the non-volatile memory device 120 will now be described.

First, referring to FIG. 1 to FIG. 6, the non-volatile memory device 120 may include the first stripe STRP1 and the second stripe STRP2. The first stripe STRP1 may include a first memory block MB1 to a fifth memory block MB5. The second stripe STRP2 may include a sixth to tenth memory blocks MB6 to MB10.

Hereinafter, an embodiment in which a ransomware attack is performed on raw data stored in the first memory block MB1 will be representatively described. However, the present disclosure is not limited to this example, as a ransomware attack may be performed in a similar manner on any memory block MB.

The memory controller 110 may falsify raw data stored in the first memory block MB1 in response to the control of the host device HST infected with ransomware. For a more concise description, raw data attacked by ransomware is referred to as victim data DT_VCT. For example, the victim data DT_VCT may be the first raw data DT_RAW1.

Each of the plurality of memory blocks MB included in the non-volatile memory device 120 may have a "program after erase" characteristic. In other words, each of the plurality of memory blocks MB included in the non-volatile memory device 120 do not allow overwriting. For example, each of the plurality of memory blocks MB may be programmed and read as a page unit, and erased as a block unit. Accordingly, when updating (e.g., modifying) arbitrary data stored in the plurality of memory blocks MB, the memory controller 110 may store the updated data in a different physical address (e.g., a different memory block) instead of overwriting the original data's physical address.

In an embodiment, when an update of data stored in the non-volatile memory device 120 is requested from the host device HST, the memory controller 110 may store the physical address of the original data along with the newly stored updated data. For example, when updating data stored in the non-volatile memory device 120, the memory controller 110 may store the physical address of the original data along with the updated data. A method by which the memory controller 110 stores the physical address of the original data along with the updated data will be described in more detail with reference to FIG. 8 to FIG. 10.

The memory controller 110 may falsify the victim data DT_VCT stored in the first memory block MB1. For example, the memory controller 110 may read the victim data DT_VCT stored in the first memory block MB1, and generate decoy data DT_DCY by falsifying the victim data DT_VCT. The memory controller 110 may then store the decoy data DT_DCY in a memory block MB included in a stripe other than the first stripe STRP1. For example, the memory controller 110 may store the decoy data DT_DCY in the sixth memory block MB6 of the second stripe STRP2.

For a more concise description, the memory block including the victim data DT_VCT is referred to as a victim memory block MB_victim, and the memory block storing the decoy data DT_DCY is referred to as a decoy memory block MB_decoy. For example, the victim memory block MB_victim may be the first memory block MB1, and the decoy memory block MB_decoy may be the sixth memory block MB6.

In addition, for a more concise description, a stripe STRP including the victim memory block MB_victim is referred to as victim stripe STRP_victim, and a stripe STRP including the decoy memory block MB_decoy is referred to as decoy stripe STRP_decoy. For example, the victim stripe STRP_victim may be the first stripe STRP1, and the decoy stripe STRP_decoy may be the second stripe STRP2.

In an embodiment, the memory controller 110 may store the physical address of the original data along with the updated data, when updating data stored in the non-volatile memory device 120. In this case, when the memory controller 110 stores the decoy data DT_DCY in the decoy memory block MB_decoy, the physical address information of the raw data DT_RAW will be stored in the decoy memory block MB_decoy along with the decoy data DT_DCY. However, the present disclosure is not limited to this method.

Next, referring to FIG. 1 to FIG. 7, the victim memory block MB_victim may include a plurality of pages. When the host device HST is infected with ransomware, the memory controller 110 may sequentially falsify data stored in the plurality of pages included in the victim memory block MB_victim. For example, the memory controller 110 may sequentially falsify data of first to n-th victim pages VPG1 to VPGn included in the victim memory block MB_victim, and may sequentially store the falsified data in first to n-th decoy pages DPG1 to DPGn included in the decoy memory block MB_decoy.

In an embodiment, the first to n-th victim pages VPG1 to VPGn may be part of the plurality of pages included in the victim memory block MB_victim. The first to n-th decoy pages DPG1 to DPGn may be part of the plurality of pages included in the decoy memory block MB_decoy.

For a more concise description, an embodiment in which the memory controller 110 falsifies the victim data DT_VCT stored in the first victim page VPG1 will be representatively described.

First, the memory controller 110 may read the victim data DT_VCT from the first victim page VPG1 (① Read victim data from victim page).

The memory controller 110 may generate decoy data DT_DCY by falsifying the victim data DT_VCT (② Generate decoy data by falsifying the victim data). For example, the memory controller 110 may generate decoy data DT_DCY by encrypting the victim data DT_VCT using any encryption scheme.

The memory controller 110 may store the decoy data DT_DCY in the first decoy page DPG1 (③ Program the decoy data in decoy page).

After that, the memory controller 110 may update an address mapping table AMT. For example, the flash translation layer 114 may invalidate the mapping for the first victim page VPG1 and validate the mapping for the first decoy page DPG1. The way the address mapping table AMT is updated will be described hereinafter with reference to FIG. 8.

Referring FIG. 1 to FIG. 8, the address mapping table AMT may include a plurality of mapping information MI. Each of the plurality mapping information MI may indicate the validity of the mapping between a logical address LA and a physical address PA. For example, first mapping information MI1 may indicate the validity of the mapping between a first logical address LA1 and a first victim page VPG1; second mapping information MI2 may indicate the validity of the mapping between a second logical address LA2 and a second victim page VPG2; and third mapping information MI3 may indicate the validity of the mapping between a third logical address LA3 and a third victim page VPG3.

When the memory controller 110 stores the decoy data DT_DCY generated based on the victim data DT_VCT stored in the first victim page VPG1 in the first decoy page DPG1, the flash translation layer 114 may map a logical address (e.g., the first logical address LA1) previously mapped to the first victim page VPG1 to the first decoy page DPG1.

More specifically, the flash translation layer 114 may invalidate the mapping for the first victim page VPG1. For example, the flash translation layer 114 may change the validity of the first mapping information MI1 from 'valid' to 'invalid'. In other words, the memory controller 110 may invalidate the mapping for the first victim page VPG1 instead of erasing the victim memory block MB_victim to delete the data stored in the first victim page VPG1.

Subsequently, the flash translation layer 114 may validate the mapping for the first decoy page DPG1. For example, the flash translation layer 114 may add the m-th mapping information MIm indicating that the mapping between the first logical address LA1 and the first decoy page DPG1 is valid to the address mapping table AMT.

In an embodiment, the memory controller 110 may store the physical address of the original data along with the updated data when updating data stored in the non-volatile memory device 120. For example, when a program request for the first logical address LA1 is provided by the host device HST while the mapping between the first logical address LA1 and the first victim page VPG1 is valid, the memory controller 110 may store the physical address of the first victim page VPG1 together with the update data in the first decoy page DPG1.

When a ransomware attack is performed on the storage device 100 in this manner, the host device HST may not be able to access the raw data (e.g., victim data DT_VCT) stored in the first victim page VPG1. For example, even if the host device HST issues a read command for the first logical address LA1 to access the raw data stored in the first victim page VPG1, the memory controller 110 may not be able to access the first victim page VPG1. More specifically, since the memory controller 110 operates based on the address mapping table AMT, it may access the first decoy page DPG1 instead of the first victim page VPG1 in response to the read command for the first logical address LA1.

Hereinafter, a method for the storage device 100 to recover from damage caused by a ransomware attack will be described. For example, referring to FIG. 9 to FIG. 11, a method of recovering from the damage caused by the ransomware attack by re-validating invalid raw data stored in the victim memory block MB_victim will be explained.

Figure 9:
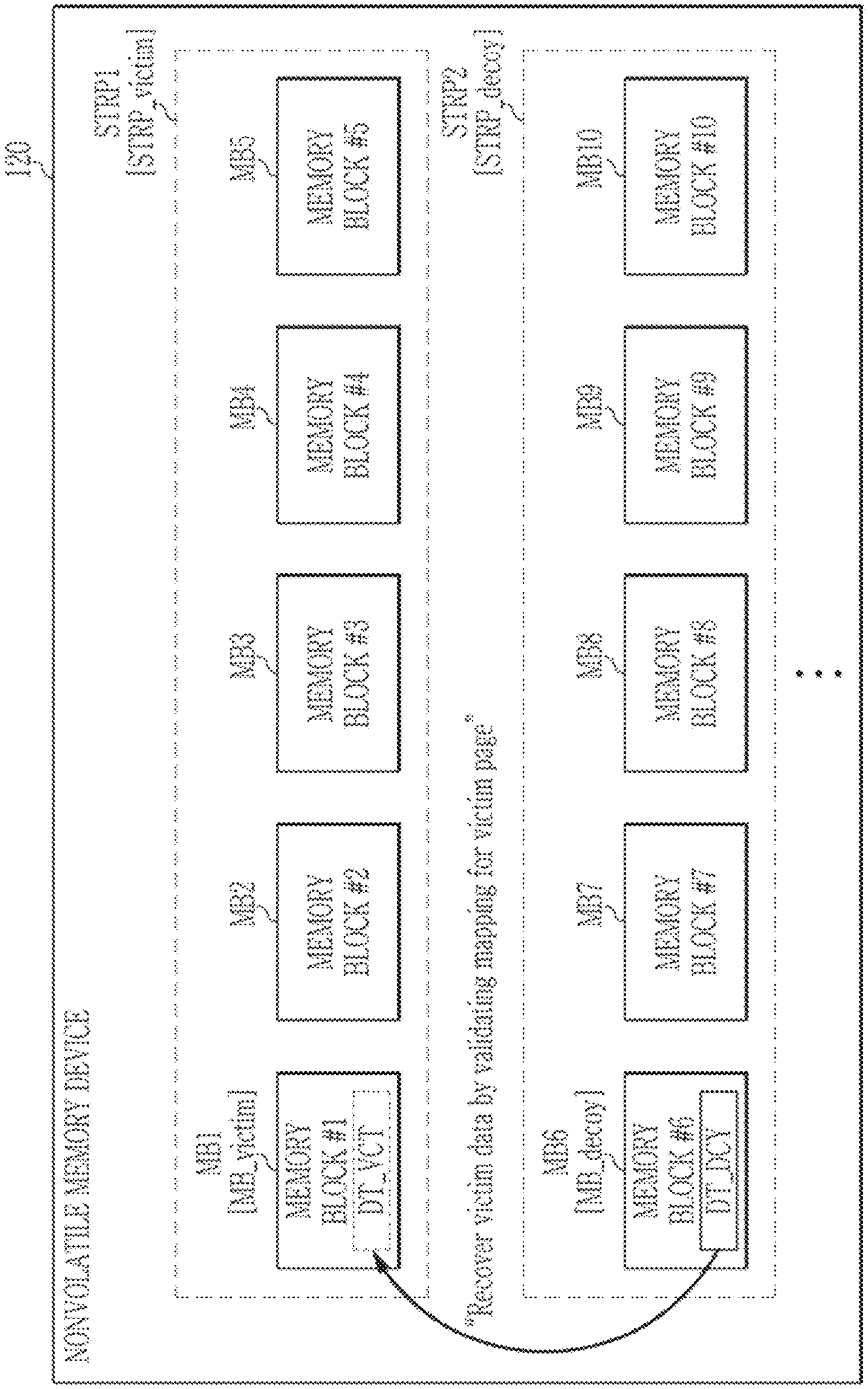
FIG. 9 shows a ransomware recovery method of the storage device of FIG. 1 according to an embodiment.

FIG. 9 shows a ransomware recovery method of the storage device of FIG. 1 according to an embodiment. Referring to FIG. 1 to FIG. 9, the non-volatile memory device 120 may include the first stripe STRP1 and the second stripe STRP2. The first stripe STRP1 may include a first memory block MB1 to a fifth memory block MB5. The second stripe STRP2 may include sixth to tenth memory blocks MB6 to MB10.

The first memory block MB1 may be attacked by ransomware. For example, the ransomware may falsify victim data DT_VCT stored in the first memory block MB1. In other words, the first memory block MB1 may be the victim memory block MB_victim. The sixth memory block MB6 may store decoy data DT_DCY generated by the ransomware attack. In other words, the sixth memory block MB6 may be a decoy memory block MB_decoy. A method of storing the decoy data DT_DCY in the decoy memory block MB_decoy due to a ransomware attack is similar to what is described above with reference to FIG. 6 to FIG. 8, and therefore no further detailed description will be provided.

Even after being attacked by ransomware, the victim memory block MB_victim may still store the victim data DT_VCT. For example, the first victim page VPG1 may store invalidated victim data DT_VCT. In other words, the victim data DT_VCT may be maintained in the first victim page VPG1, but the victim data DT_VCT may be in a non-accessible state by the host device HST because the first mapping information MI1 is invalidated. Consequently, after being attacked by ransomware, the victim memory block MB_victim may not be erased (e.g., not garbage collected).

The memory controller 110 may recover the victim data DT_VCT based on the decoy data DT_DCY. For example, using the decoy data DT_DCY, the recovery managing module 112*c* may identify the physical address (e.g., first victim page VPG1) where the victim data DT_VCT is stored. The method by which the recovery managing module 112*c* identifies the physical address where the victim data DT_VCT is stored will be described in more detail with reference to FIG. 10.

Afterward, the recovery managing module 112*c* may recover the victim data DT_VCT by validating the mapping for the first victim page VPG1. The method by which the recovery managing module 112*c* validates the mapping for the first victim page VPG1 will be described in more detail with reference to FIG. 11.

Figure 10:
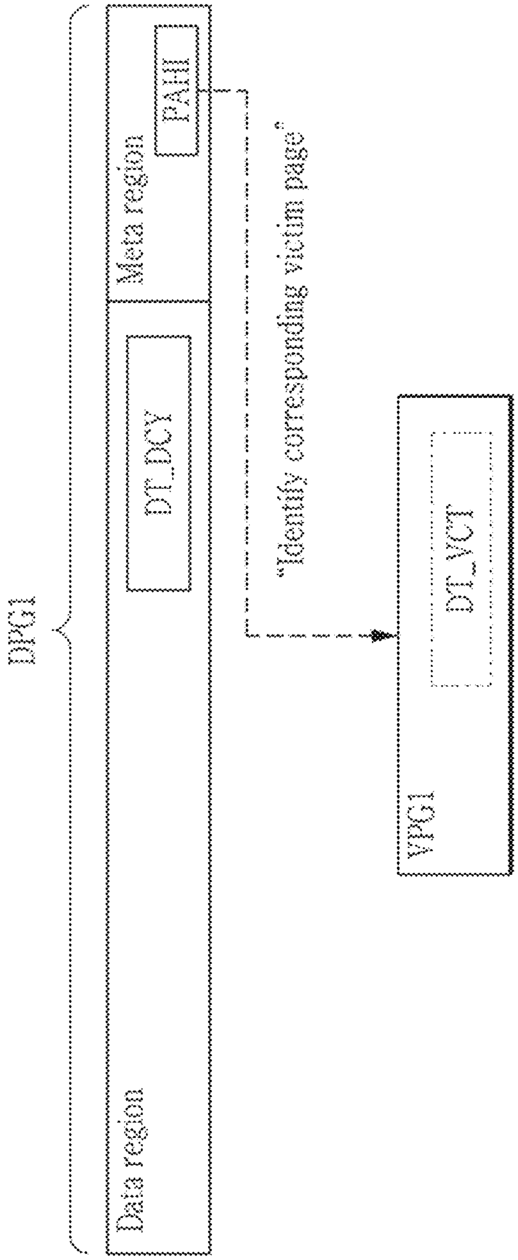
FIG. 10 illustrates a method of identifying a physical address with the victim data of FIG. 9.

FIG. 10 illustrates a method of identifying a physical address where the victim data of FIG. 9 is stored. Referring to FIG. 1 to FIG. 10, the first decoy page DPG1 may include a data region and a meta region.

The data region may be a region used to store data provided from the host device HST. In other words, the data region may be accessible to the host device HST. For example, the data region of the first decoy page DPG1 may store the decoy data DT_DCY.

On the other hand, the meta region may be a region used to store various types of meta data for managing the operation of the storage device 100. In other words, the meta region may be non-accessible for the host device HST. For example, the meta region of the first decoy page DPG1 may store physical address history information PAHI.

The physical address history information PAHI may indicate the physical address where the decoy data DT_DCY was stored before being falsified. For example, the physical address history information PAHI may indicate the physical address where the victim data DT_VCT used by ransomware to generate the decoy data DT_DCY is stored. More specifically, the physical address history information PAHI may indicate a physical page number (PPN) corresponding to the first victim page VPG1.

In an embodiment, the physical address history information PAHI may be stored at the time point when the decoy data DT_DCY is stored in the first decoy page DPG1. For example, in response to an update request for data stored in the non-volatile memory device 120, the memory controller 110 may store the physical address of the original data along with the updated data.

Hereinafter, it is assumed that the memory controller 110 is implemented to store the physical address of the original data together with the updated data when updating data stored in the non-volatile memory device 120. In other words, an embodiment in which information about the physical address indicating where the raw data DT_RAW is stored (e.g., physical address information corresponding to the first victim page VPG1) is stored in the decoy page DPG along with the decoy data DT_DCY will be representatively described. However, the present disclosure is not limited thereto, and the memory controller 110 may manage the physical address of the original data in any manner when updating data stored in the non-volatile memory device 120. For example, when updating data stored in the non-volatile memory device 120, the memory controller 110 may store physical address history information PAHI for the physical address of the original data in some regions of the volatile memory device 115. In this case, the memory controller 110 may identify a victim page VPG based on the physical address history information PAHI stored in the volatile memory device 115. In other words, the present disclosure is not limited to the specific way in which the physical address of the original data is managed when data stored in the non-volatile memory device 120 is updated.

The ransomware detect module 112*a* may detect ransomware attacks from the host device HST. In this case, the recovery managing module 112*c* may identify the victim page VPG corresponding to the decoy data DT_DCY. For example, the recovery managing module 112*c* may identify the physical address where the original data corresponding to the first decoy page DPG1 (e.g., data used to generate the decoy data DT_VCT through the ransomware attack) is stored based on the physical address history information PAHI stored in first decoy page DPG1. In other words, the recovery managing module 112*c* may identify the first victim page VPG1 based on the physical address history information PAHI.

When the victim data DT_VCT is stored in the identified victim page VPG, the recovery managing module 112*c* may recover the decoy data DT_DCY based on the victim data DT_VCT stored in the victim page VPG. For example, when the victim data DT_VCT is stored in an invalid state (e.g., an invalid data state without being mapped to any logical address) in the first victim page VPG1, the recovery managing module 112*c* may be re-validate the mapping information for the first victim page VPG1.

In other words, when a memory block (e.g., victim memory block MB_victim) including the identified victim page DT_VCT is not garbage collected, the recovery managing module 112*c* may perform the ransomware recovery operation by simply validating the victim page DT_VCT in the invalid-state.

A method by which the recovery managing module 112*c* recovers the decoy data DT_DCY based on the victim data DT_VCT stored in an invalid state will be described in more detail with reference to FIG. 11.

FIG. 11 shows a method for recovering the victim data of FIG. 9 in more detail. Referring to FIG. 1 to FIG. 11, the recovery managing module 112*c* may perform a ransomware recovery operation by validating the victim page VPG identified based on the physical address history information PAHI included in the decoy page DPG. Hereinafter, a method of recovering a first victim page VPG1 based on a first decoy page DPG1 will be representatively described.

The physical address history information PAHI stored in the first decoy page DPG1 may indicate the first victim page VPG1. The first victim page VPG1 may store victim data DT_VCT in an invalid state. For example, the address mapping table AMT includes first mapping information MI1 indicating that the mapping between the first victim page VPG1 and the first logical address LA1 is invalid, and m-th mapping information MIm indicating that the mapping between the first decoy page DPG1 and the first logical address LA1 is valid.

The recovery managing module 112*c* may perform a ransomware recovery operation by validating the victim data DT_VCT stored in an invalid state in the first victim page VPG1. For example, the recovery managing module 112*c* may validate the first mapping information MI1 and invalidate the m-th mapping information MIm. In this case, when the host device HST accesses the first logical address LA1, the victim data DT_VCT stored in the first victim page VPG1 may be read.

In other words, when the victim data DT_VCT remains in the victim memory block MB_victim even after a ransomware attack, the memory controller 110 may restore the damage caused by ransomware by updating the address mapping table AMT. Therefore, according to the embodiment of FIG. 9 to FIG. 11, even if the decoding algorithm is not applied to recover the decoy data DT_DCY, the damage caused by ransomware can be restored.

Figure 12:
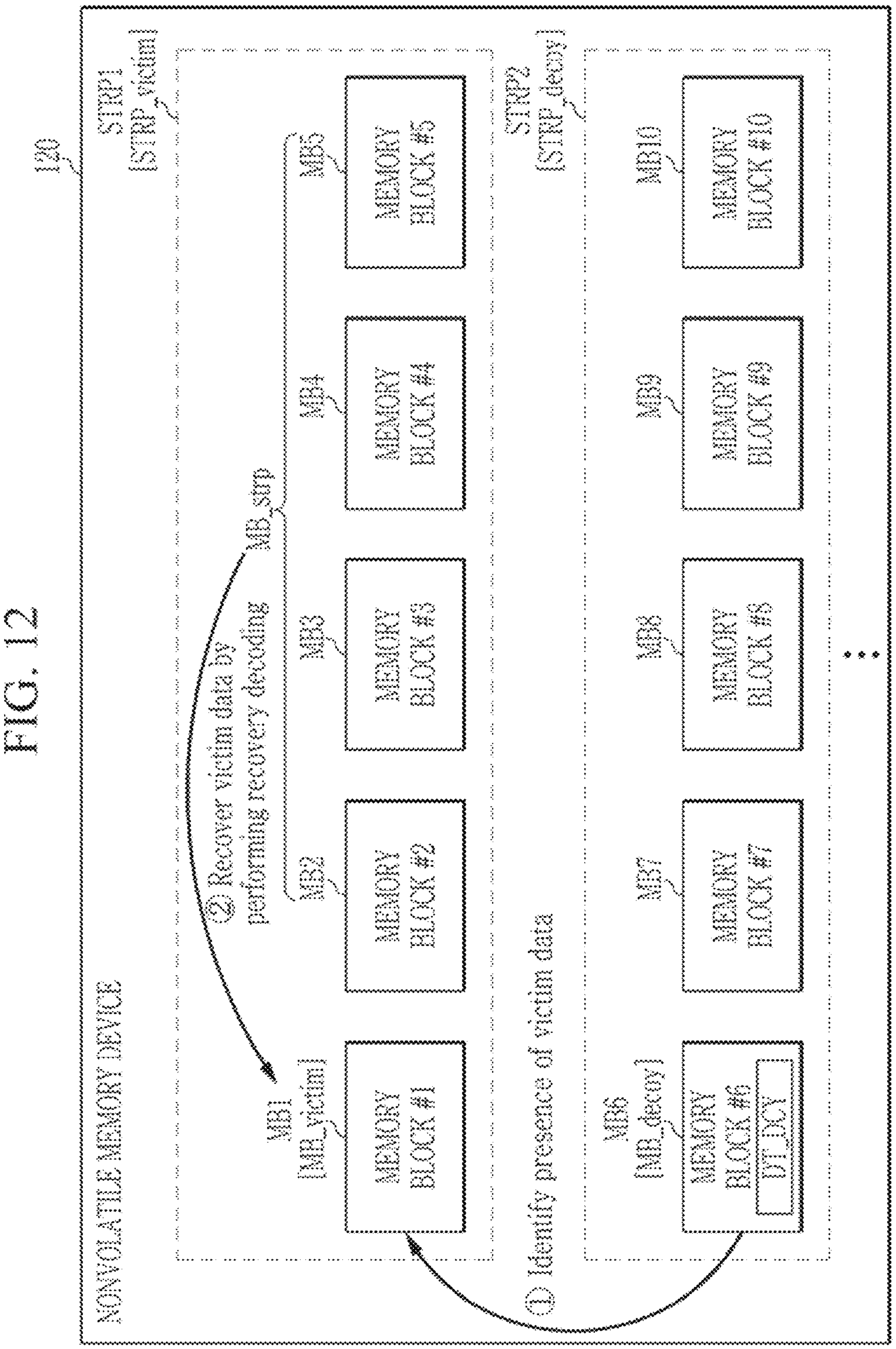
FIG. 12 shows a ransomware recovering method of the storage device of FIG. 1 according to an embodiment.

FIG. 12 shows a ransomware recovering method of the storage device of FIG. 1 according to an embodiment. Referring to FIG. 1 to FIG. 8 and FIG. 12, a non-volatile memory device 120 may include a first stripe STRP1 and a second stripe STRP2. The first stripe STRP1 may include first to fifth memory blocks MB1 to MB5. The second stripe STRP2 may include sixth to tenth memory blocks MB6 to MB10. The first memory block MB1 may be a victim memory block MB_victim. The sixth memory block MB6 may be a decoy memory block MB_decoy.

After being attacked by ransomware, the victim memory block MB_victim may be erased. For example, after being attacked by ransomware, a garbage collection (GC) operation may be performed on the victim memory block MB_victim. In this case, the victim data DT_VCT stored in the victim memory block MB_victim may be lost. In other words, the victim memory block MB_victim may no longer include the victim data DT_VCT.

The memory controller 110 may identify whether the victim data DT_VCT exists in the victim memory block MB_victim based on the decoy data DT_DCY (① Identify presence of victim data). For example, the recovery managing module 112*c* may identify whether the victim data DT_VCT exists in the victim page VPG identified based on physical address history information PAHI in a similar manner as described above with reference to FIG. 9 and FIG. 10.

The memory controller 110 may identify whether the victim memory block MB_victim has been erased after a ransomware attack, based on whether victim data DT_VCT exists in the victim page VPG. In other words, the recovery managing module 112*c* may determine whether garbage collection has been performed on the victim memory block MB_victim by checking if the victim data DT_VCT exists in the victim page VPG. However, the present disclosure is not limited thereto, and the memory controller 110 may identify whether the victim memory block MB_victim has been erased after a ransomware attack by checking whether the victim memory block MB_victim is in a free block state.

When it is determined that the victim memory block MB_victim has been erased after a ransomware attack, the recovery managing module 112*c* may recognize that ransomware recovery is impossible using the method described with reference to FIG. 9 to FIG. 11. In this case, the recovery managing module 112*c* may perform a ransomware recovery operation based on a victim stripe STRP_victim.

More specifically, the recovery managing module 112*c* may perform a ransomware recovery operation based on striping memory blocks MB_strp for the victim memory block MB_victim. For example, the recovery managing module 112*c* may recover the victim data DT_VCT by performing recovery decoding based on striping memory blocks MB_strp through the recovery coding module 112*b* (② Recover victim data by performing recovery decoding).

The striping memory blocks MB_strp for the victim memory block MB_victim may refer to the remaining memory blocks, excluding the victim memory block MB_victim, among the memory blocks MB included in victim stripe STRP_victim. For example, when the first memory block MB1 is the victim memory block MB_victim, the second to fifth memory blocks MB2 to MB5 may be striping memory blocks MB_strp for the victim memory block MB_victim.

When the victim memory block MB_victim has already been erased, the memory controller 110 may recover the victim data DT_VCT based on the victim stripe STRP_victim. A method by which memory controller 110 recovers the victim data DT_VCT through recovery decoding will be described in more detail with reference to FIG. 13 to FIG. 15.

Figure 13:
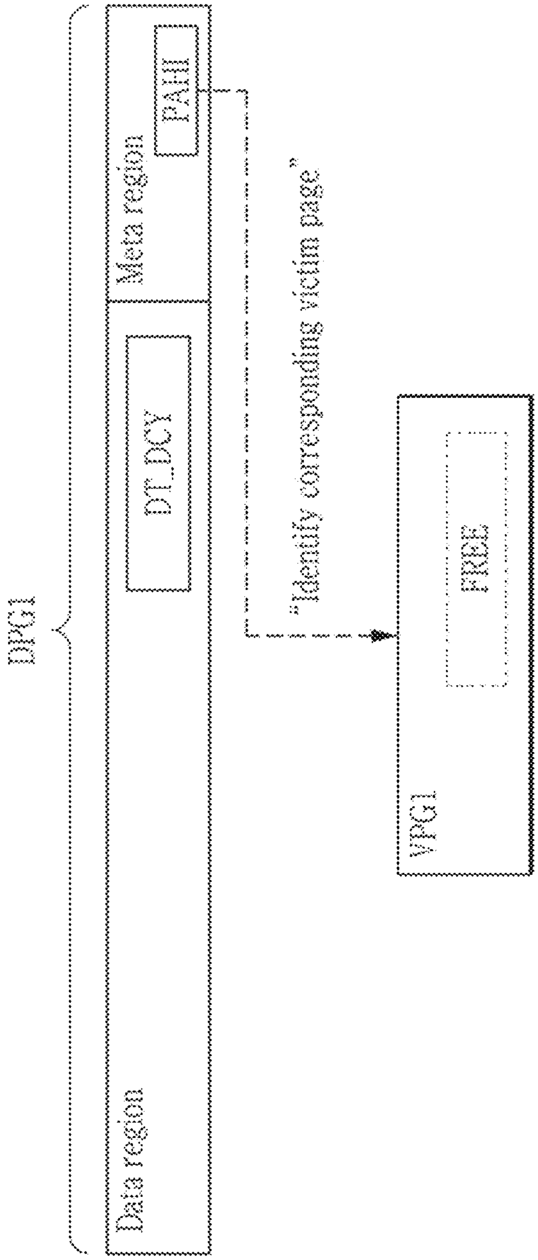
FIG. 13 shows an example of how to identify the victim memory block of FIG. 12.

FIG. 13 shows an example of how to identify the victim memory block of FIG. 12. Referring to FIG. 1 to FIG. 8 and FIG. 12 to FIG. 13, the recovery managing module 112*c* may identify the first victim page VPG1 based on the first decoy page DPG1. For example, the recovery managing module 112*c* may identify the first victim page VPG1 based on physical address history information PAHI stored in the first decoy page DPG1. Since the method by which the recovery managing module 112*c* identifies the first victim page VPG1 is similar to what is described above with reference to FIG. 10, no further detailed description will be provided.

The recovery managing module 112*c* may identify that garbage collection has been performed on the victim memory block MB_victim after the ransomware attack. For example, the recovery managing module 112*c* may identify that garbage collection has been performed on the victim memory block MB_victim based on the fact that the first victim page VPG1 is in a free state. However, the present disclosure is not limited thereto, and the recovery managing module 112*c* may also identify that the victim memory block MB_victim has been erased after the ransomware attack if the victim memory block MB_victim, including the first victim page VPG1, is in a free block state.

Figure 14:
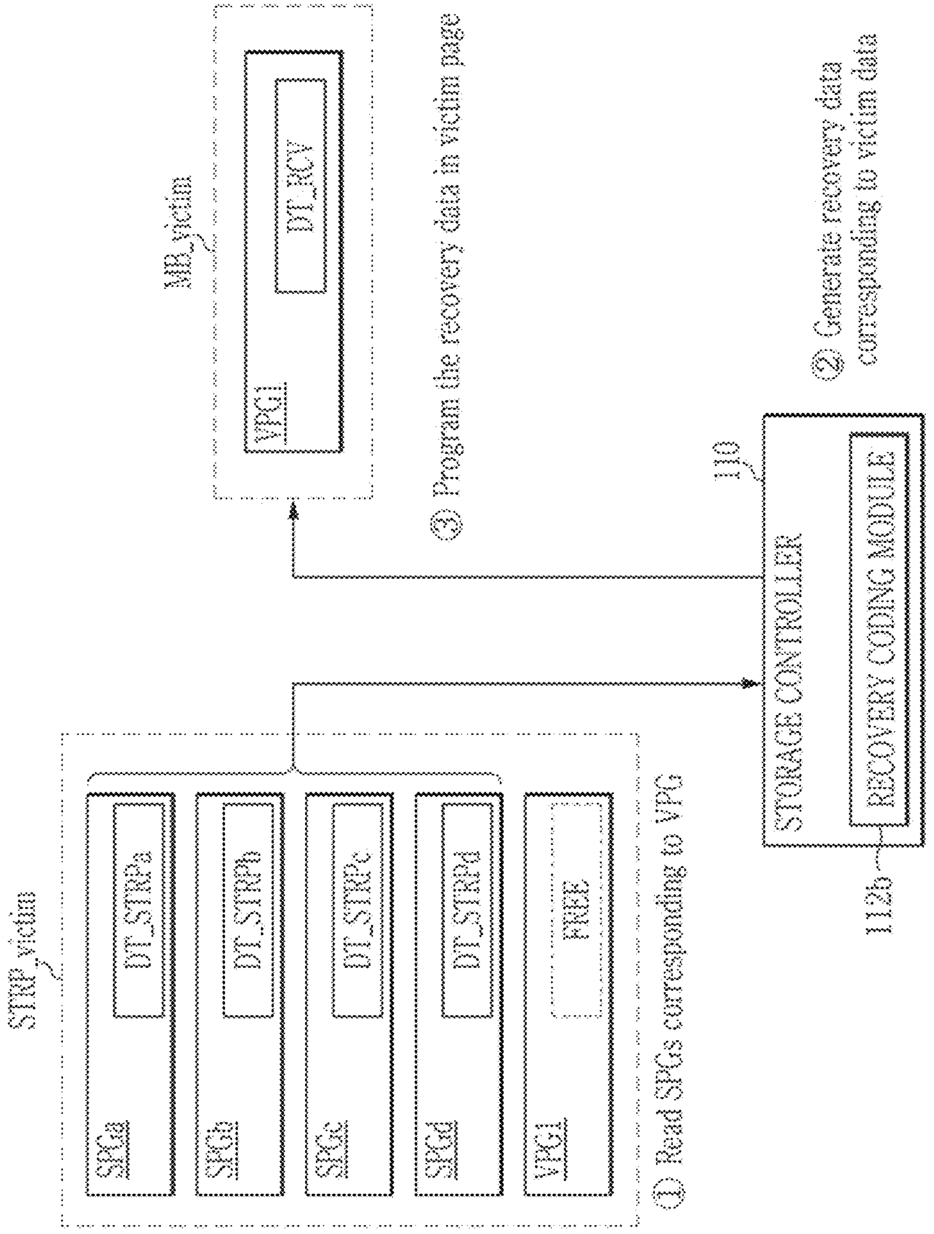
FIG. 14 shows how the recovery decoding of FIG. 12 is performed.

FIG. 14 shows how the recovery decoding of FIG. 12 is performed. Referring to FIG. 1 to FIG. 8 and FIG. 12 to FIG. 14, the memory controller 110 may perform the recovery decoding based on the victim stripe STRP_victim.

The victim stripe STRP_victim may include a victim memory block MB_victim and a plurality of striping memory blocks MB_strp corresponding to the victim memory block MB_victim. Hereinafter, for a more concise description, it is assumed that the first memory block MB1 is the victim memory block MB_victim, and each of the second to fifth memory blocks MB2 to MB5 is a striping memory block MB_strp corresponding to the victim memory block MB_victim.

The victim memory block MB_victim may include a victim page VPG. After a ransomware attack, when the victim memory block MB_victim is erased (e.g., garbage collection), the victim page VPG may be in a free state. For example, first victim page VPG1 may not store victim data DT_VCT.

Each of the plurality of striping memory blocks MB_strp may store a striping page SPG corresponding to the victim page VPG. For example, each of the second to fifth memory blocks MB2 to MB5 may include first, second, third and fourth striping pages SPGa, SPGb, SPGc and SPGd respectively. The first to fourth striping pages SPGa to SPGd may respectively store first, second, third and fourth striping data DT_STRPa, DT_STRPb, DT_STRPc and DT_STRPd. In other words, each of the striping memory blocks MB_strp corresponding to the victim memory block MB_victim may not be erased after the ransomware attack.

In an embodiment, the first to fourth striping page SPGa to SPGd may be arranged in positions corresponding to the victim page VPG. In other words, the first to fourth striping pages SPGa to SPGd and the victim page VPG may be arranged at corresponding positions in different memory blocks MB.

In an embodiment, each of the memory blocks included in one stripe STRP may be implemented such that they are not simultaneously erased. For example, each memory block included in the victim stripe STRP_victim may be included in a different superblock. In this case, even though the victim memory block MB_victim is erased through garbage collection after the ransomware attack, the data stored in the victim memory block MB_victim may be recovered based on the plurality of striping memory blocks MB_strp. The relationship between the superblock and the stripe will be described in more detail with reference to FIG. 21 to FIG. 25.

The memory controller 110 may read a plurality of striping pages SPG corresponding to the victim page VPG (① Read SPGs corresponding to VPG). For example, the memory controller 110 may sequentially read the first to fourth striping data DT_STRPa to DT_STRPd.

The memory controller 110 may generate recovery data DT_RCV corresponding to the victim data DT_VCT (② Generate recovery data corresponding to victim data). For example, the memory controller 110 may generate the recovery data DT_RCV corresponding to the victim data DT_VCT that was stored before the victim memory block MB_victim was erased. For example, the recovery coding module 112*b* may generate the recovery data DT_RCV by performing a recovery decoding operation based on the first to fourth striping data DT_STRPa to DT_STRPd. A method by which the recovery coding module 112*b* generates the recovery data DT_RCV will be described in more detail with reference to FIG. 15.

The memory controller 110 may program the recovery data DT_RCV into the victim page VPG (③ Program the recovery data in victim page). For example, the memory controller 110 may program the recovery data DT_RCV into the first victim page VPG1. After that, the memory controller 110 may update the address mapping table AMT in a similar manner to what is described above with reference to FIG. 11. In this case, when the host device HST accesses the first logical address LA1, the victim data DT_VCT stored in the first victim page VPG1 may be read.

Figure 15:
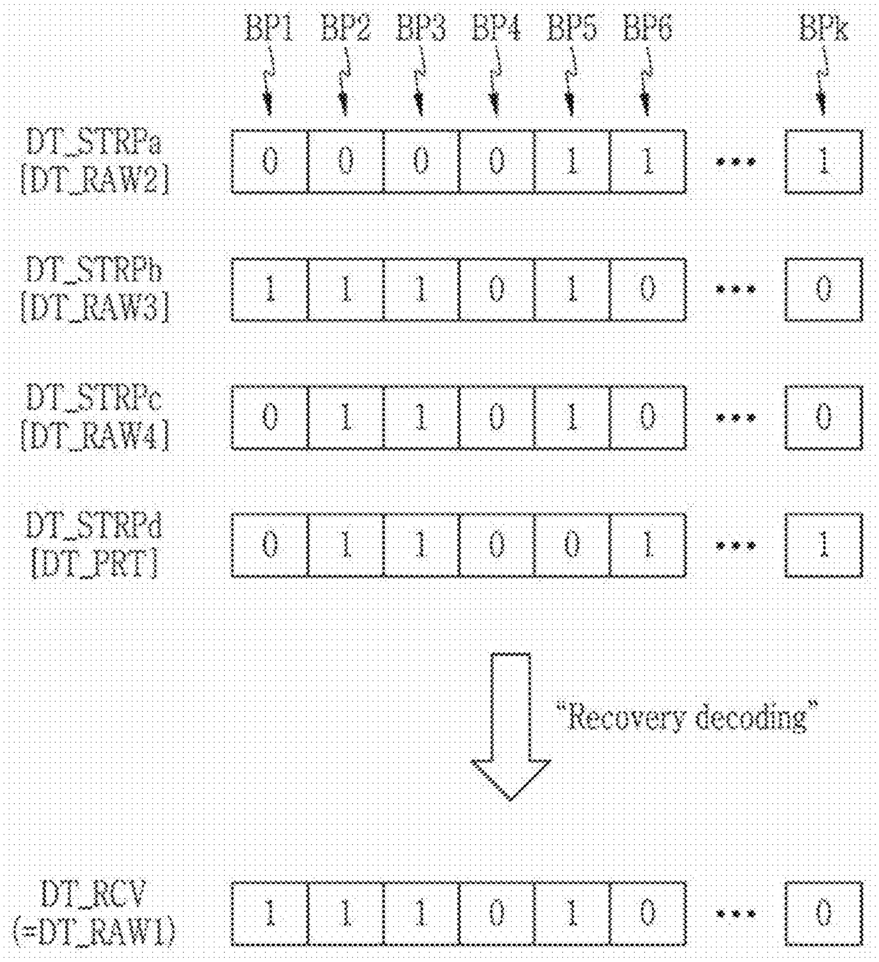
FIG. 15 shows the operation of the recovery decoding module of FIG. 14 in more detail.

FIG. 15 shows the operation of the recovery coding module of FIG. 14 in more detail. Referring to FIG. 1 to FIG. 8 and FIG. 12 to FIG. 15, the memory controller 110 may read the first to fourth striping data DT_STRPa to DT_STRPd. In this case, the first to fourth striping data DT_STRPa to DT_STRPd may respectively correspond to the second to fourth raw data DT_RAW2 to DT_RAW4 described above with reference to FIG. 5.

The recovery coding module 112*b* may perform the recovery decoding operation based on the first to fourth striping data DT_STRPa to DT_STRPd. For example, the recovery coding module 112*b* may generate parity data DT_PRT (see FIG. 5) by performing an XOR operation for each bit position BP of the first to fourth striping data DT_STRPa to DT_STRPd. In other words, the recovery coding module 112*b* may generate the recovery data DT_RCV by performing an XOR operation on bits included in the same bit position BP for each of the first to fourth striping data DT_STRPa to DT_STRPd.

More specifically, the recovery coding module 112*b* may calculate the bit included in the first bit position BP1 of the recovery data DT_RCV, by performing an XOR operation on bits included in a first bit position BP1 of the first to fourth striping data DT_STRPa to DT_STRPd. For example, the first bit position BP1 of the first to fourth striping data DT_STRPa to DT_STRPd may include bits "0", "1", "0", and "0", respectively. In this case, the recovery coding module 112*b* performs the "$0\oplus1\oplus0\oplus0$" operation (where $\oplus$ represents the XOR operator) to calculate the "1" bit included in the first bit position BP1 of the recovery data DT_RCV.

Similarly, the recovery coding module 112*b* may calculate the "1" bit included in a second bit position BP2 of the parity data DT_PRT by performing the "$0\oplus1\oplus1\oplus1$" operation. In this way, the recovery coding module 112*b* may calculate each of the bits included in the first to k-th bit positions BP1 to BPk of the recovery data DT_RCV. In this case, the recovery data DT_RCV may correspond to the first raw data DT_RAW1 described above with reference to FIG. 5. In this way, the recovery coding module 112*b* may be able to recover the recovery data DT_RCV that is the same as the victim data DT_VCT.

For a more concise description, FIG. 5 illustrates an embodiment in which the recovery coding module 112*b* generates the recovery data DT_RCV through the XOR operation. However, the present disclosure is not limited to this methods. For example, the recovery coding module 112*b* may generate the recovery data DT_RCV using the Reed-Solomon coding method. In other words, the present disclosure is not limited to the specific coding scheme used by the recovery coding module 112*b*.

Figure 16:
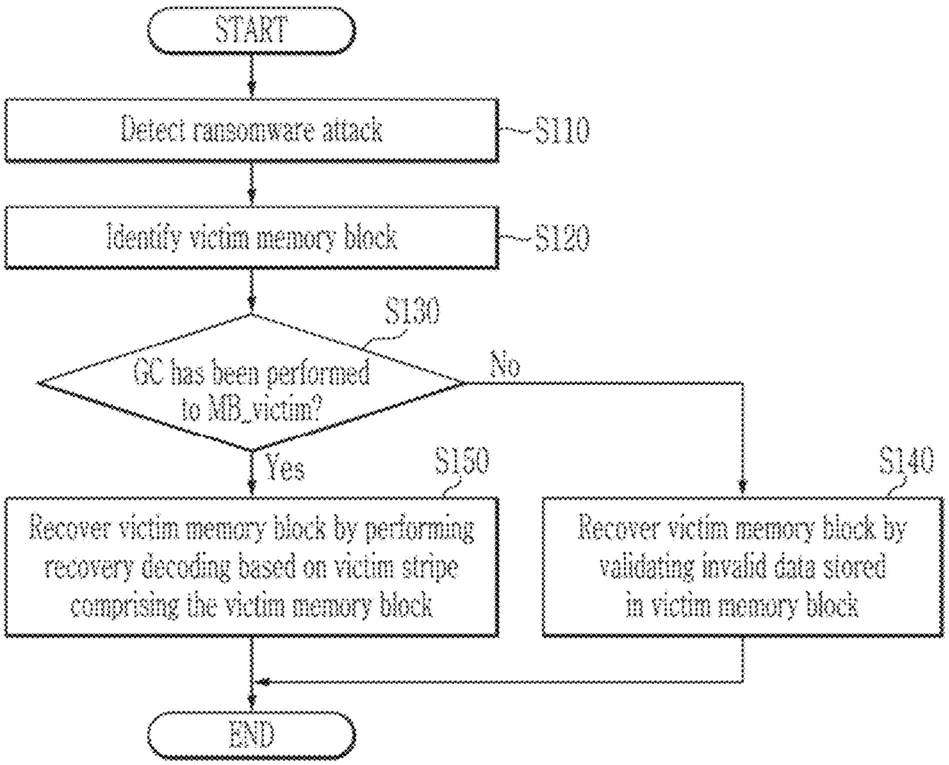
FIG. 16 is a flowchart of an operation method of a memory controller performing a ransomware recovery operation according to an embodiment of the present disclosure.

FIG. 16 is a flowchart of a method for operating a memory controller that performs a ransomware recovery operation according to an embodiment of the present disclosure. Referring to FIG. 1 to FIG. 16, in S110, a memory controller 110 may detect a ransomware attack. For example, the ransomware detect module 112*a* may detect a ransomware attack based on an operation log or operation flow of the memory controller 110.

In S120, the memory controller 110 may identify a victim memory block MB_victim. For example, the recovery managing module 112*c* may identify the victim memory block MB_victim including the victim page VPG based on physical address history information PAHI stored in a decoy page DPG.

In S130, the memory controller 110 may determine whether garbage collection has been performed on the victim memory block MB_victim. For example, the recovery managing module 112*c* may determine whether the victim memory block MB_victim has been erased after the ransomware attack. In other words, the recovery managing module 112*c* may determine whether the victim memory block MB_victim has been erased before S110 is performed and after the ransomware attack.

In one embodiment, the memory controller 110 may determine whether the victim memory block MB_victim is erased after the ransomware attack is performed based on whether the victim page VPG is in a free state. This embodiment will be described in more detail with reference to FIG. 17A.

In one embodiment, the memory controller 110 may determine whether the victim memory block MB_victim is erased after the ransomware attack is performed based on whether the victim memory block MB_victim is in a free block state. This embodiment will be described in more detail with reference to FIG. 17B.

When it is determined that garbage collection has not been performed on the victim memory block MB_victim, S140 may be performed. When it is determined that the garbage collection has been performed on the victim memory block MB_victim, S150 may be performed.

In S140, the memory controller 110 may restore the victim memory block MB_victim by validating invalid data stored in the victim memory block MB_victim. For example, the memory controller 110 may recover the victim memory block MB_victim through the method described previously with reference to FIG. 9 to FIG. 11. The step S140 will be described in more detail with reference to FIG. 18.

In an embodiment, invalid data may refer to data stored in a page that is not mapped to any logical address. Conversely, valid data may refer to data stored in a page mapped to a logical address. However, the present disclosure is not limited thereto.

In S150, the memory controller 110 may recover the victim memory block MB_victim by performing recovery decoding based on the victim stripe STRP_victim. For example, the memory controller 110 may recovery the victim memory block MB_victim using the method described previously with reference to FIG. 12 to FIG. 15. The step S150 will be described in more detail with reference to FIG. 19.

Figure 17A:
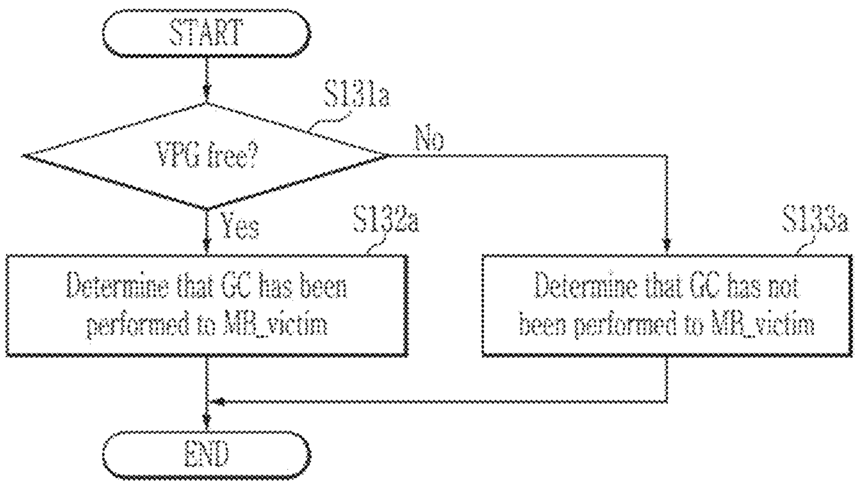
FIG. 17A and FIG. 17B are flowcharts that shows the step S130 of FIG. 16 in more detail.
Figure 17B:
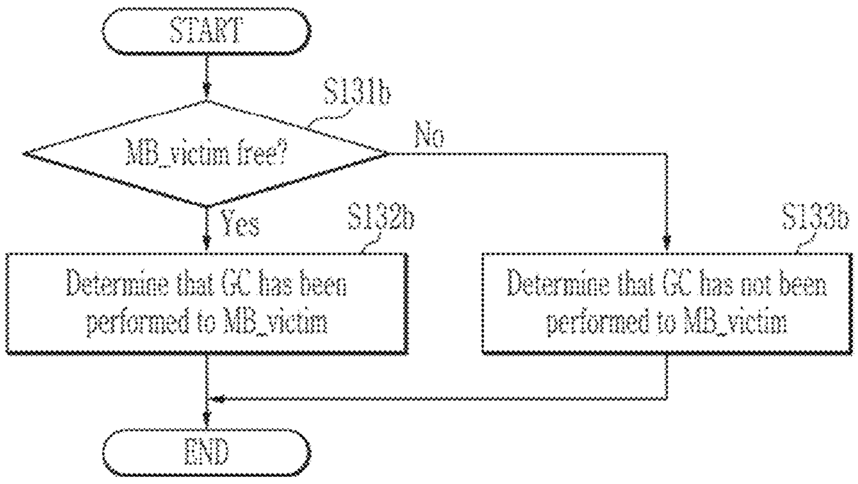

FIG. 17A and FIG. 17B are flowcharts that shows the step S130 of FIG. 16 in more detail.

First, referring to FIG. 1 to FIG. 16 and FIG. 17A, the step S130 may include S131*a* to S133*a*.

In S131*a*, the memory controller 110 may determine whether the victim page VPG is in a free state. If it is determined that the victim page VPG is in a free state, S132*a* may be performed. If it is determined that the victim page VPG is not in a free state, S133*a* may be performed.

In S132*a*, the memory controller 110 may determine that garbage collection has not been performed on the victim memory block MB_victim. In S133*a*, the memory controller 110 may determine that the garbage collection has been performed on the victim memory block MB_victim.

Next, referring to FIG. 1 to FIG. 16 and FIG. 17B, the step S130 may include S131*b* to S133*b*.

In S131*b*, the memory controller 110 may determine whether the victim memory block MB_victim is in a free block state. For example, when the memory controller 110 is implemented to manage a memory block state table indicating a state (e.g., free state, bad-block state, etc.) of each memory block MB included in the non-volatile memory device 120, the memory controller 110 may determine whether the victim memory block MB_victim is in a free block state based on the memory block state table. If it is determined that the victim memory block MB_victim is in a free block state, S132*b* may be performed. If it is determined that the victim memory block MB_victim is not in a free block state, S133*b* may be performed.

In S132*b*, the memory controller 110 may determine that garbage collection has been performed on the victim memory block MB_victim. In S133*b*, the memory controller 110 may determine that the garbage collection has not been performed on the victim memory block MB_victim.

For a more concise description, an embodiment in which the memory controller 110 determines whether garbage collection has been performed on the victim memory block MB_victim based on whether the victim page VPG is in a free state is described with reference FIG. 17A, and an embodiment in which the memory controller 110 determines whether the garbage collection has been performed on the victim memory block MB_victim based on whether the victim memory block MB_victim is in a free block state is described with reference FIG. 17B. However, the present disclosure is not limited thereto. For example, when parity data DP_PRT is generated when all data memory blocks in the victim stripe STRP_victim are fully occupied, the memory controller 110 may determine that the garbage collection has been performed on the victim memory block MB_victim even if one or more of the random pages included in the victim memory block MB_victim are in the free state. In other words, the present disclosure is not limited to the specific method of determining whether garbage collection has been performed on the victim memory block MB_victim. However, hereinafter, as described with reference to FIG. 17A, an embodiment in which the memory controller 110 determines whether garbage collection has been performed on the victim memory block MB_victim based on whether the victim page VPG is in a free state will be representatively described.

Figure 18:
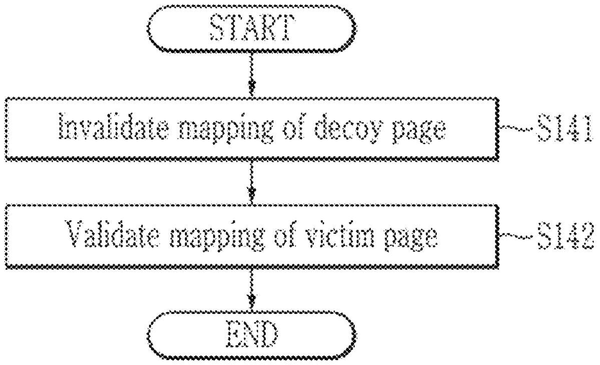
FIG. 18 is a flowchart that shows the step S140 of FIG. 16 in detail.

FIG. 18 is a flowchart that shows the step S140 of FIG. 16 in detail. Referring to FIG. 1 to FIG. 18, the step S140 may include S141 to S142.

In S141, the memory controller 110 may invalidate the mapping of the decoy page DPG. For example, the memory controller 110 may invalidate the first mapping information MI1 that maps a first decoy page DPG1 to a first logical address LA1.

In S142, the memory controller 110 may validate the mapping of the victim page VPG. For example, the memory controller 110 may validate the m-th mapping information MIm that maps the first victim page VPG1 to the first logical address LA1.

As a result, when S141 and S142 are performed, the host device HST may be able to access data (e.g., victim data DT_VCT) stored in the victim page VPG based on the first logical address LA1.

In one embodiment, the memory controller 110 may sequentially recovery a plurality of victim pages VPG included in the victim memory block MB_victim by repeatedly performing the steps S141 and S142. For example, the memory controller 110 may perform the steps S141 and S142 multiple times to recover the plurality of victim pages VPG.

Figure 19:
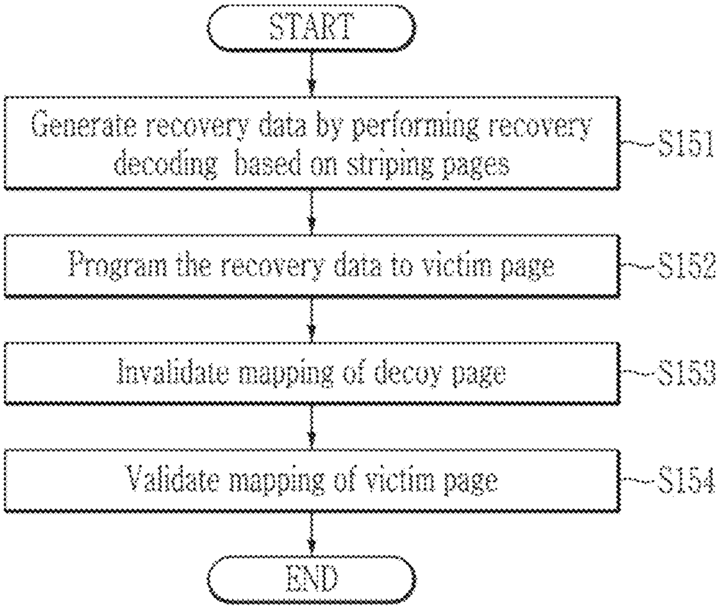
FIG. 19 is a flowchart that shows the step S150 of FIG. 16 in more detail.

FIG. 19 is a flowchart that shows the step S150 of FIG. 16 in more detail. Referring to FIG. 1 to FIG. 19, the step S150 may include S151 to S154.

In S151, the memory controller 110 may generate recovery data DT_RCV by performing recovery decoding based on the plurality of striping pages SPG. For example, the recovery coding module 112*b* may generate recovery data DT_RCV by performing recovery decoding based on the plurality of striping data DT_STRP stored in the plurality of striping pages SPG.

In S152, the memory controller 110 may program recovery data DT_RCV into the victim page VPG. For example, the memory controller 110 may program the recovery data DT_RCV corresponding to victim data DT_VCT into the victim page VPG.

In S153, the memory controller 110 may invalidate the mapping of the decoy page DPG. In S154, the memory controller 110 may validate mapping of the victim page VPG. Since the operations of the memory controller 110 in S153 and S154 are similar to the operations described in S141 and S142, no further detailed description will be provided.

As a result, when steps S151 to S154 are performed, the host device HST may be able to access data (e.g., victim data DT_VCT) stored in the victim page VPG based on the first logical address LA1.

Figure 20:
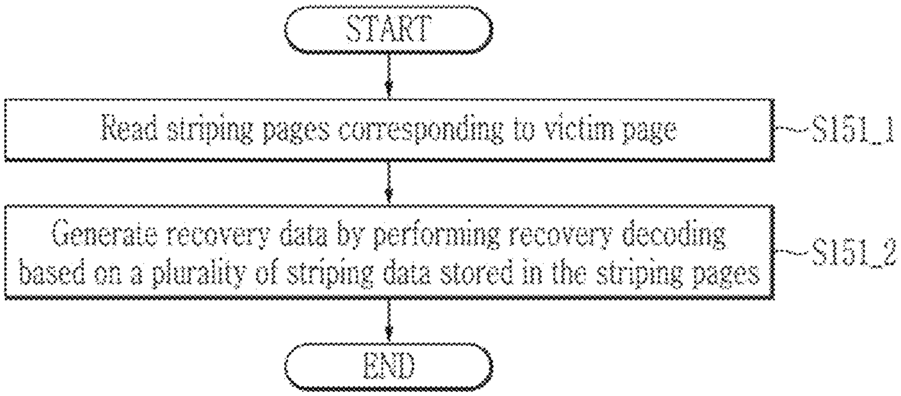
FIG. 20 is a flowchart that shows the step S151 of FIG. 19 in more detail.

FIG. 20 is a flowchart of the step S151 of FIG. 19 in more detail. Referring to FIG. 1 to FIG. 19, the step S151 may include S151_1 to S151_2.

In S151_1, the memory controller 110 may read the plurality of striping pages SPG corresponding to the victim page VPG. For example, the memory controller 110 may read the plurality of striping data DT_STRP from the remaining memory blocks, which are not victim memory block MB_victim, among the memory blocks included in victim stripe STRP_victim.

In an embodiment, the position within the striping memory block MB_strp of the plurality of striping page SPG may be the same as the position within the victim memory block MB_victim of the victim page VPG.

In S151_2, the memory controller 110 may generate recovery data DT_RCV by performing recovery decoding based on the plurality of striping data DT_STRP stored in the plurality of striping page SPG. For example, the recovery coding module 112*b* may generate recovery data DT_RCV by performing an XOR operation for each bit position BP of the first to fourth striping data DT_STRPa to DT_STRPd.

Figure 21:
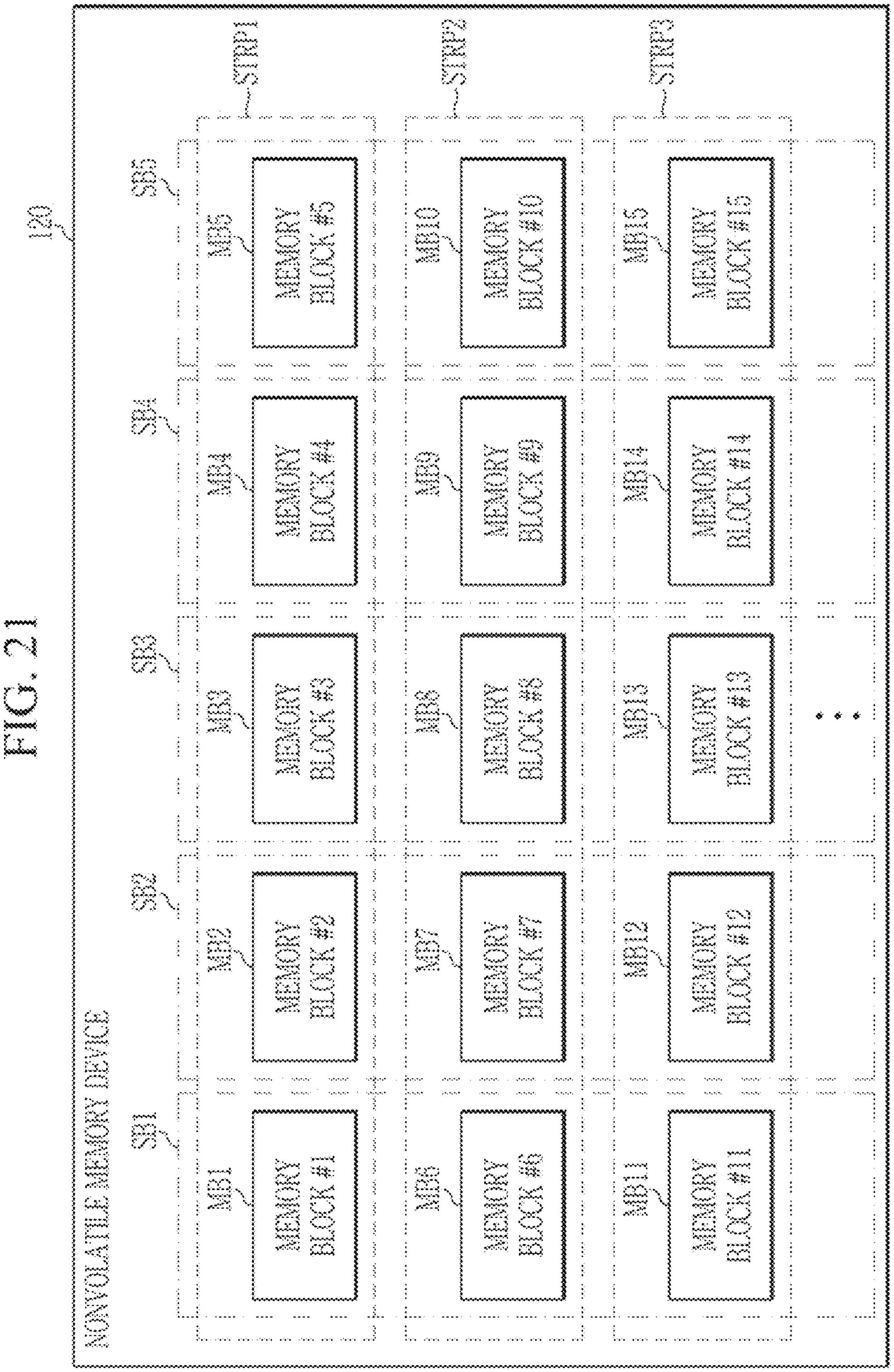
FIG. 21 is a diagram that shows a relationship between stripes and superblocks according to an embodiment of the present disclosure.

FIG. 21 is a diagram that shows relationship between stripes and superblocks according to an embodiment of the present disclosure. Hereinafter, referring to FIG. 1 to FIG. 21, an embodiment in which one stripe STRP includes one parity memory block will be representatively described.

A non-volatile memory device 120 may include a plurality of stripes STRP. For example, the non-volatile memory device 120 may include a first stripe STRP1 to a third stripe STRP3.

Each of the plurality of stripes STRP may include a plurality of memory blocks MB. For example, the first stripe STRP1 may include a first memory block MB1, a second memory block MB2, a third memory block MB3, a fourth memory block MB4, and a fifth memory block MB5. The second stripe STRP2 may include a sixth memory block MB6, a seventh memory block MB7, an eighth memory block MB8, a ninth memory block MB9, and a tenth memory block MB10. The third stripe STRP3 may include an eleventh memory block MB11, a twelfth memory block MB12, a thirteenth memory block MB13, a fourteenth memory block MB14, and a fifteenth memory block MB15.

Each of the plurality of stripes STRP may include one parity memory block. For example, the fifth memory block MB5, the tenth memory block MB10, and the fifteenth memory block MB15 may be parity memory blocks. In this case, even if data stored in one of the memory blocks in any single stripe STRP is lost, the memory controller 110 may perform recovery decoding to recover the lost data based on the data stored in other memory blocks MB where the data has not been lost. For example, the memory controller 110 may recover the lost data using a method similar to what is described previously with reference to FIG. 14 and FIG. 15.

However, if data stored in two or more memory blocks MB in any single stripe STRP is lost, the memory controller 110 cannot recover the lost data by performing recovery decoding. In other words, when each of the plurality of stripes STRP includes one parity memory block, the memory controller 110 may be able to recover data loss of one or fewer memory blocks MB in the single stripe STRP through recovery decoding. However, the present disclosure is not limited thereto. For example, each of the plurality of stripes STRP may include two or more parity memory blocks. In this case, the memory controller 110 may be able to recover data loss in two or more memory block MBs within a single stripe STRP through recovery decoding. An embodiment in which each of the plurality of stripes STRP includes two or more parity memory blocks will be described in more detail with reference to FIG. 24 to FIG. 25.

A plurality of memory blocks MB included in one stripe STRP may be included in different superblocks SB. For example, the first to fifth memory blocks MB1 to MB5 may be included in a first, second, third, fourth and fifth superblock SB1, SB2, SB3, SB4 and SB5, respectively. Similarly, the sixth to tenth memory blocks MB6 to MB10 may be respectively included in the first to fifth superblocks SB1 to SB5, and the eleventh to fifteenth memory blocks MB11 to MB15 may be respectively included in the first to fifth superblocks SB1 to SB5.

The memory controller 110 may perform a garbage collection operation with superblocks SB as units. In the garbage collection operation, the memory controller 110 reads valid data stored in each of the plurality of memory blocks MB included in one superblock SB, erases all memory blocks MB in one superblock SB, and newly stores valid data in any memory block MB.

The memory controller 110 may simultaneously erase the plurality of memory blocks MB included in one superblock SB. For example, when the garbage collection operation is performed on the first superblock SB1, the memory controller 110 may simultaneously erase the first, sixth, and eleventh memory blocks MB1, MB6, and MB11.

In an embodiment, any stripe STRP and any superblock SB may include only one memory block as an intersection. For example, the first superblock SB1 and the first stripe STRP1 may include the first memory block MB1 as an intersection. In this case, even if the garbage collection operation is performed on one superblock SB, one or fewer memory blocks MB may be erased in each stripe STRP. In other words, even if the garbage collection is performed on any superblock, two or more memory blocks MB may not be simultaneously erased within each stripe STRP. If it were implemented to simultaneously erase two or more memory blocks MB included in any stripe STRP when a garbage collection is performed for any superblock, the memory controller 110 might find it challenging to perform the ransomware recovery operation using the method described previously with reference to FIG. 12 to FIG. 15 after a random memory block in the corresponding stripe is attacked by ransomware. Accordingly, according to the embodiment of FIG. 21, even if the garbage collection is performed after a ransomware attack, the possibility of the memory controller 110 recovering from the ransomware can be maximized.

Figure 22:
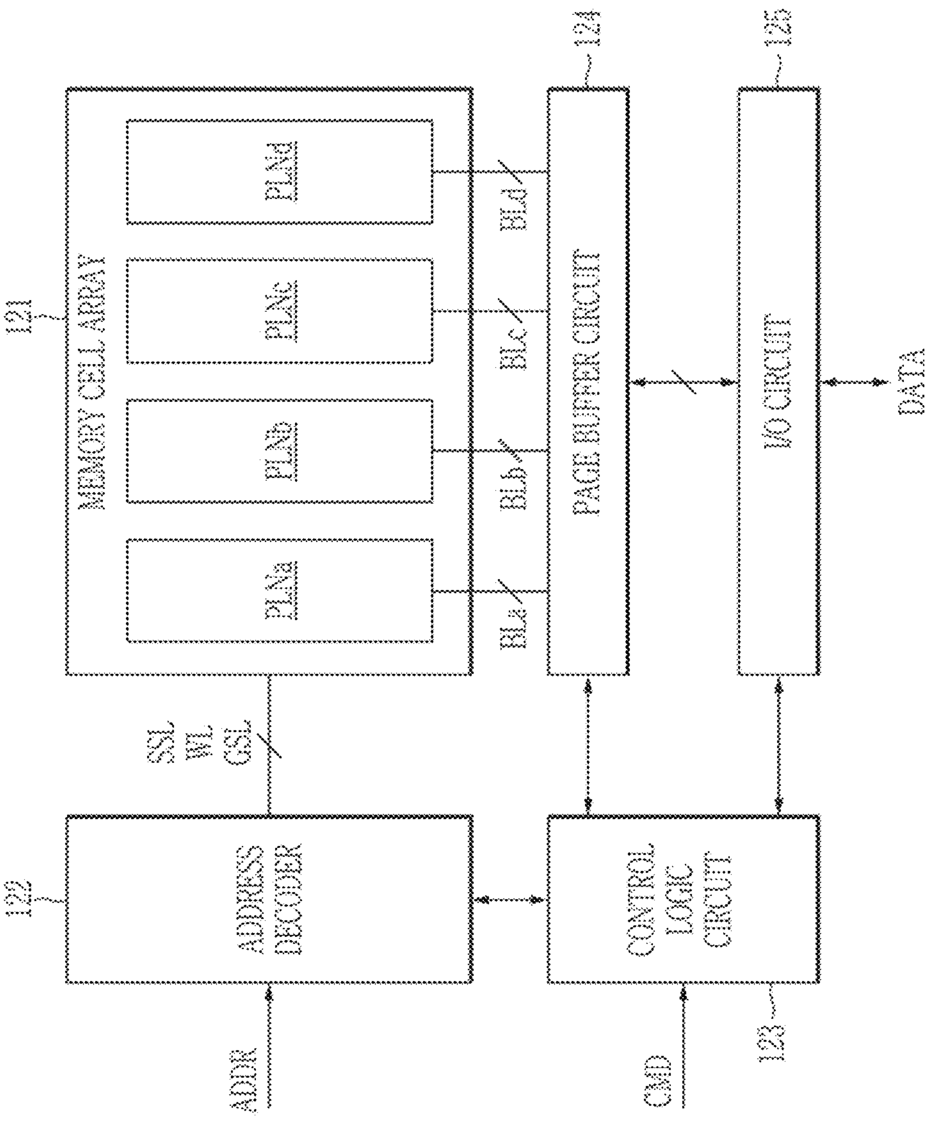
FIG. 22 and FIG. 23 are block diagrams that show the relationship between the stripe and the superblock of FIG. 21 according to an embodiment.
Figure 23:
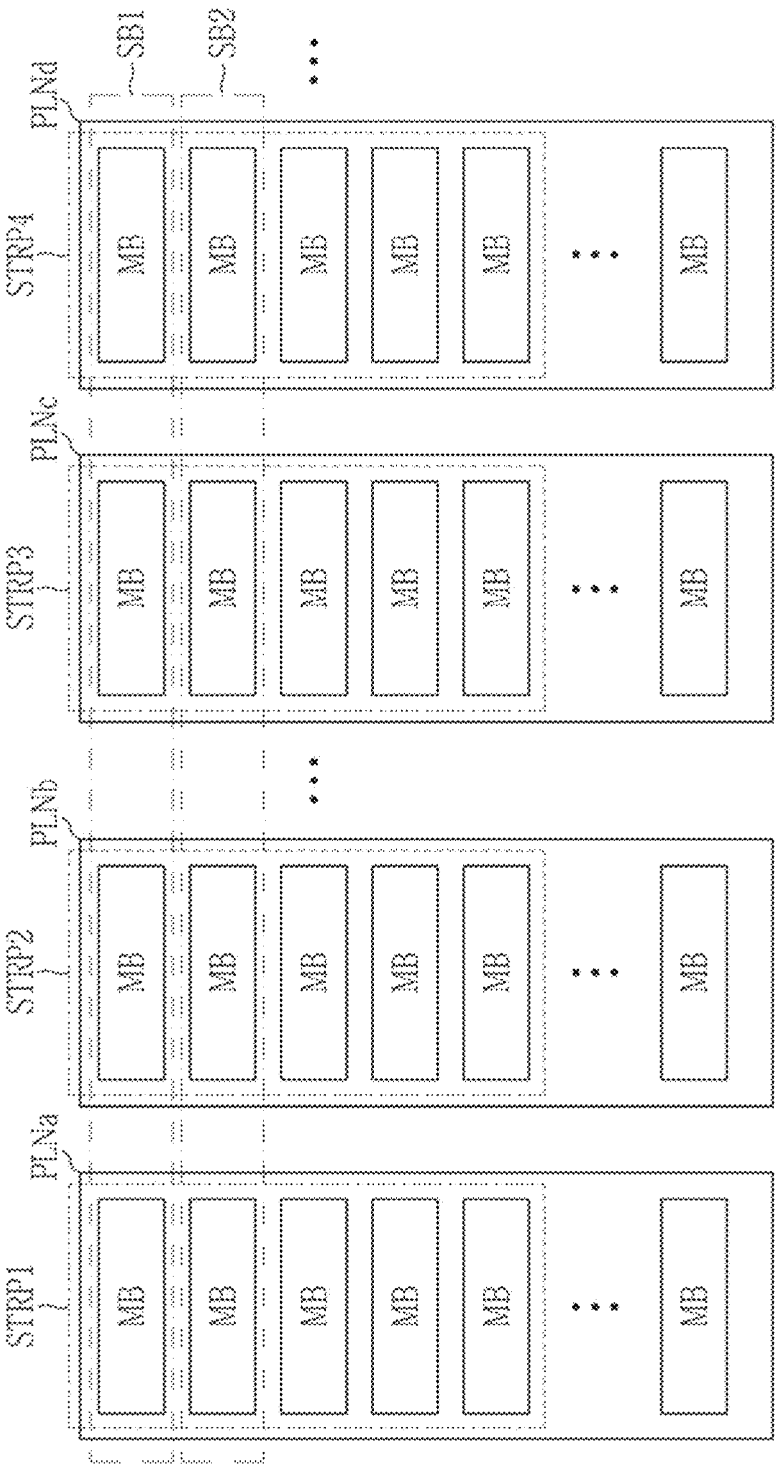

FIG. 22 and FIG. 23 are block diagrams that show the relationship between the stripe and the superblock of FIG. 21 according to an embodiment. First, referring to FIG. 1 to FIG. 22, a non-volatile memory device 120 may include a memory cell array 121, an address decoder 122, a control logic circuit 123, a page buffer circuit 124, and an input/output circuit 125.

The memory cell array 121 may include a plurality of planes PLN. For example, the memory cell array 121 may include first, second, third and fourth planes PLNa, PLNb, PLNc and PLNd.

Each of the plurality of planes PLN may be connected to string selection lines SSL, word lines WL, and ground selection lines GSL. For example, each of the first plane PLNa to the fourth plane PLNd may be connected to the string selection lines SSL, the word lines WL, and the ground selection lines GSL.

Each of the plurality of planes PLN may be connected to different bit lines BL. For example, the first plane PLNa to the fourth plane PLNd may be connected to first bit lines BLa, second bit lines BLb, third bit lines BLc and fourth bit lines BLd, respectively.

Each of the plurality of planes PLN may include a plurality of memory blocks MB. For example, the first plane PLNa to the fourth plane PLNd each may include a plurality of memory blocks MB. Each of the plurality of memory blocks MB may include a plurality of memory cells.

A plurality of memory blocks included in the same plane may share the same bit lines. For example, a plurality of memory blocks included in the first plane PLNa may share the first bit lines BLa, and a plurality of memory blocks included in the second plane PLNb may share the second bit lines BLb. In other words, different planes may be connected to different bit lines.

The address decoder 122 may be connected to the memory cell array 121 through the string selection lines SSL, the word lines WL, and the ground selection lines GSL. The address decoder 122 may receive an address ADDR from the memory controller 110. The address decoder 122 may decode the address ADDR and control a voltage level of the string selection lines SSL, the word lines WL, and the ground selection lines GSL based on the decoded result.

The page buffer circuit 124 may be connected to the first to fourth bit lines BLa to BLd. For example, the page buffer circuit 124 may temporarily store data read from the first to fourth planes PLNa to PLNd, or data to be stored in the first to fourth planes PLNa to PLNd.

The control logic circuit 123 may receive a command CMD from the memory controller 110. The control logic circuit 123 may control overall operations of the non-volatile memory device 120 based on the received command CMD.

The input/output circuit 125 may receive data DATA from the page buffer circuit 124 and output the received data DATA to the memory controller 110. Alternatively, the input/output circuit 125 may receive the data DATA from the memory controller 110 and transmit the received data DATA to the page buffer circuit 124.

Continuously, further referring to FIG. 23, each of the first to fourth planes PLNa to PLNd may include a plurality of different memory blocks MB.

Each of the plurality of superblocks SB may include a plurality of memory blocks MB included in a different plane PLN. In other words, the memory blocks MB included in any superblock SB can be distributed across different planes. For example, the memory blocks MB included in the first superblock SB1 may be included in the first to fourth planes PLNa to PLNd, respectively, and the memory blocks MB included in the second superblock SB2 may be included in the first to fourth planes PLNa to PLNd, respectively.

Each of the plurality of stripes STRP may include a plurality of memory blocks MB within a single plane PLN. In other words, memory blocks MB included in any stripe STRP may be located in the same plane. For example, memory blocks MB included in the first stripe STRP1 may be included in the first plane PLNa, memory blocks MB included in the second stripe STRP2 may be included in the second plane PLNb, memory blocks MB included in the third stripe STRP3 may be included in the third plane PLNc, and memory blocks MB included in the fourth stripe STRP4 may be included in the fourth plane PLNd.

For a more concise description, FIG. 22 and FIG. 23 representatively illustrate an embodiment in which each of the plurality of superblocks SB includes a plurality of memory blocks MB situated in different planes PLN.

However, the present disclosure is not limited to the physical arrangement of the plurality of memory blocks MB within the superblock SB. For example, the configuration of the memory blocks MB within the superblock SB may be determined in a vendor specific manner. In such cases, the arrangement of the stripes STRP may follow a method similar to the method described above with reference to FIG. 21.

Figure 24:
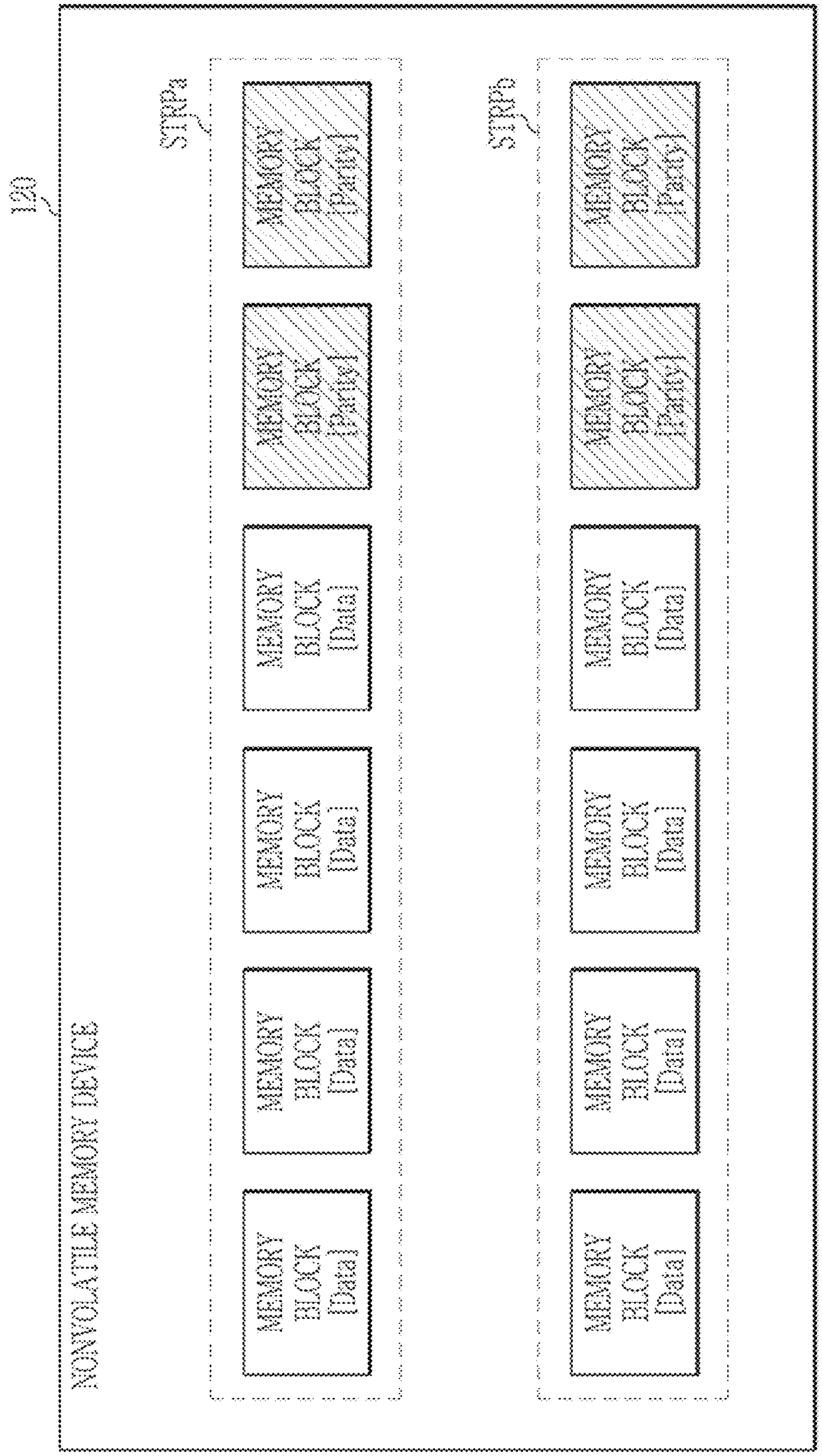
FIG. 24 is a block diagram that shows a relationship between stripes and superblocks according to an embodiment.

FIG. 24 is a block diagram that shows a relationship between stripes and superblocks according to an embodiment. Referring to FIG. 1 to FIG. 20, FIG. 22, and FIG. 24, a non-volatile memory device 120 may include a plurality of stripes STRP. For example, the non-volatile memory device 120 may include a first stripe STRPa and a second stripe STRPb.

Each of the plurality of stripes STRP may include a plurality of data memory blocks and a plurality of parity memory blocks. For example, each of the first stripe STRPa and the second stripe STRPb may include two parity memory blocks.

A plurality of parity memory blocks within one stripe STRP may store a plurality of parity data generated by performing recovery encoding on a plurality of raw data stored in a plurality of data memory block within the same stripe STRP. For example, the memory controller 110 may generate two parity data by performing recovery encoding using erasure coding or Reed-Solomon coding on the plurality of raw data, and store the generated two parity data in two parity memory blocks, respectively. Hereinafter, an embodiment where two parity memory blocks are included in one stripe STRP will be representatively described.

Even if data stored in one or two memory blocks MB in any stripe STRP is lost, the memory controller 110 may recover the lost data by performing recovery decoding based on data stored in the remaining memory blocks MB where data has not been lost. For example, if the data of the two data memory blocks included in the first stripe STRPa is lost, the memory controller 110 may perform recovery decoding to recover the lost data using the data stored in the remaining data memory blocks included in the first stripe STRPa and the two parity memory blocks. In this case, even if any stripe STRP and any superblock SB share two memory blocks, the memory controller 110 may recover the data stored in the erased memory block after garbage collection is performed on the superblock.

FIG. 24 represents an embodiment in which one stripe STRP includes two parity memory blocks, but the present disclosure is not limited thereto. For example, one stripe STRP may include three or more parity memory blocks. In this case, even if data stored in three or more memory blocks MB in any stripe STRP is lost, the memory controller 110 may recover the lost data by performing recovery decoding based on the data stored in the remaining memory blocks MB whose data has not been lost. In other words, the number of memory blocks MB that the memory controller 110 can recover through recovery decoding depends on the number of parity memory blocks included in each of the plurality of stripes STRP.

Figure 25:
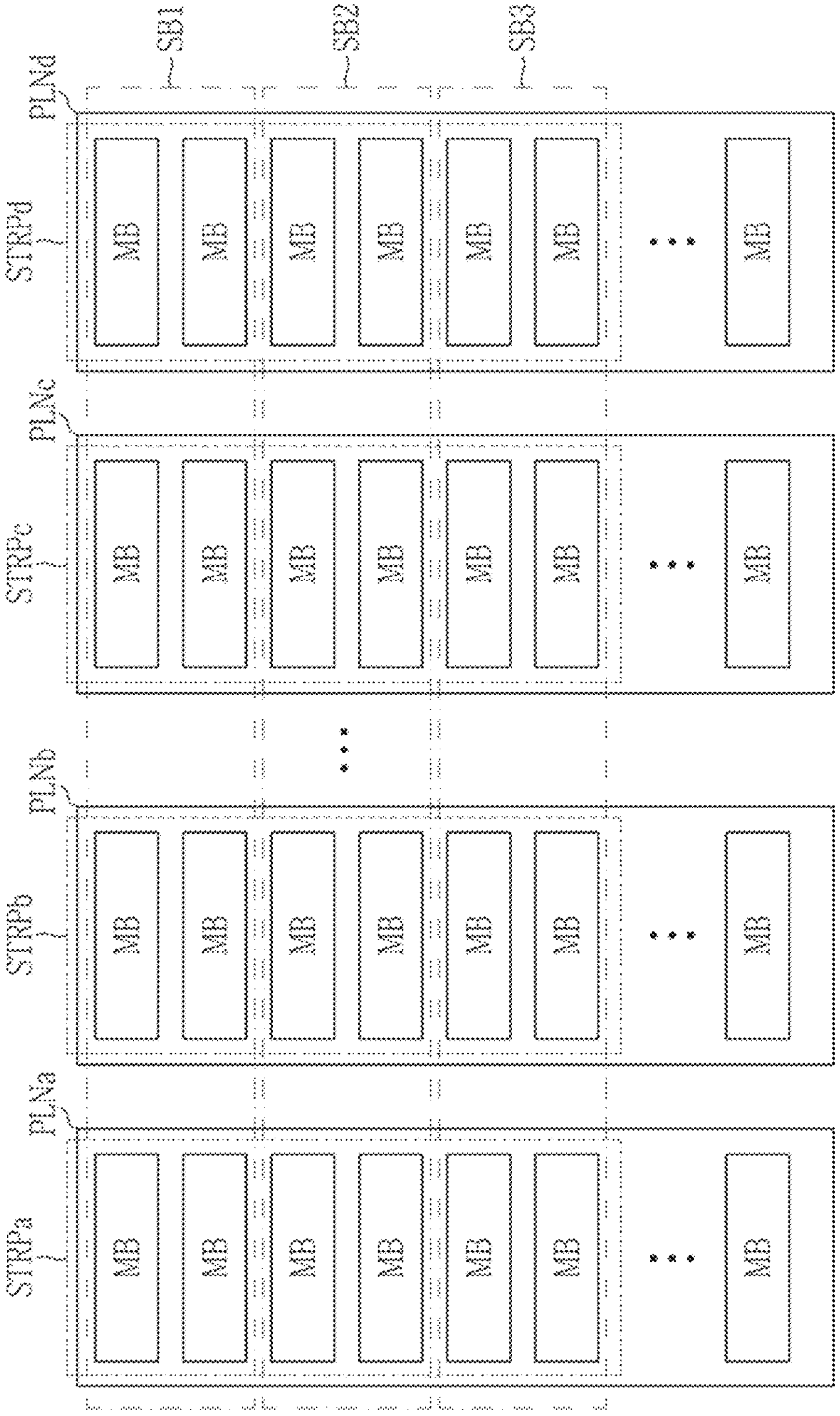
FIG. 25 is a block diagram that illustrates a relationship between the stripe and the superblock according to the embodiment of FIG. 24.

FIG. 25 is a block diagram that illustrates a relationship between the stripe and the superblock according to the embodiment of FIG. 24. Referring to FIG. 1 to FIG. 20, FIG. 22, and FIG. 24 to FIG. 25, each of the first to fourth planes PLNa to PLNd may include a plurality of different memory blocks MS.

Each of the plurality of superblocks SB may include two memory blocks MB for each plane PLN. For example, a first superblock SB1 may include two memory blocks for each of the first to fourth planes PLNa to PLNd.

Each of the plurality of stripes STRP may include a plurality of memory blocks MB included in a single plane PLN. In other words, the memory blocks MB included in any stripe STRP may be included in the same plane. For example, memory blocks MB included in the first stripe STRP1 may be included in the first plane PLNa, memory blocks MB included in the second stripe STRP2 may be included in the second plane PLNb, memory blocks MB included in the third stripe STRP3 may be included in the third plane PLNc, and the memory blocks MB included in the fourth stripe STRP4 may be included in the fourth plane PLNd.

In other words, any stripe STRP and any superblock SB may include two (or less) memory blocks as an intersection. For example, a first stripe STRPa and a first superblock SB1 may share two memory blocks as an intersection.

In this case, even if a garbage collection operation is performed on one superblock SB, two or fewer memory blocks MB may be erased for each stripe STRP. In other words, even if the garbage collection is performed on any superblock SB, three or more memory blocks MB may not be simultaneously erased within each stripe STRP. If it were implemented to simultaneously erase three or more memory blocks included in any stripe during garbage collection for any superblock, the memory controller 110 might have difficulty performing the ransomware recovery operation using the method described previously with reference to FIG. 12 to FIG. 15, particularly when garbage collection occurs after a random memory block in the stripe is attacked by ransomware. Therefore, according to the embodiment of FIG. 25, even if the garbage collection is performed after a ransomware attack, the memory controller 110 can maximize the possibility of recovering from the ransomware.

Figure 26:
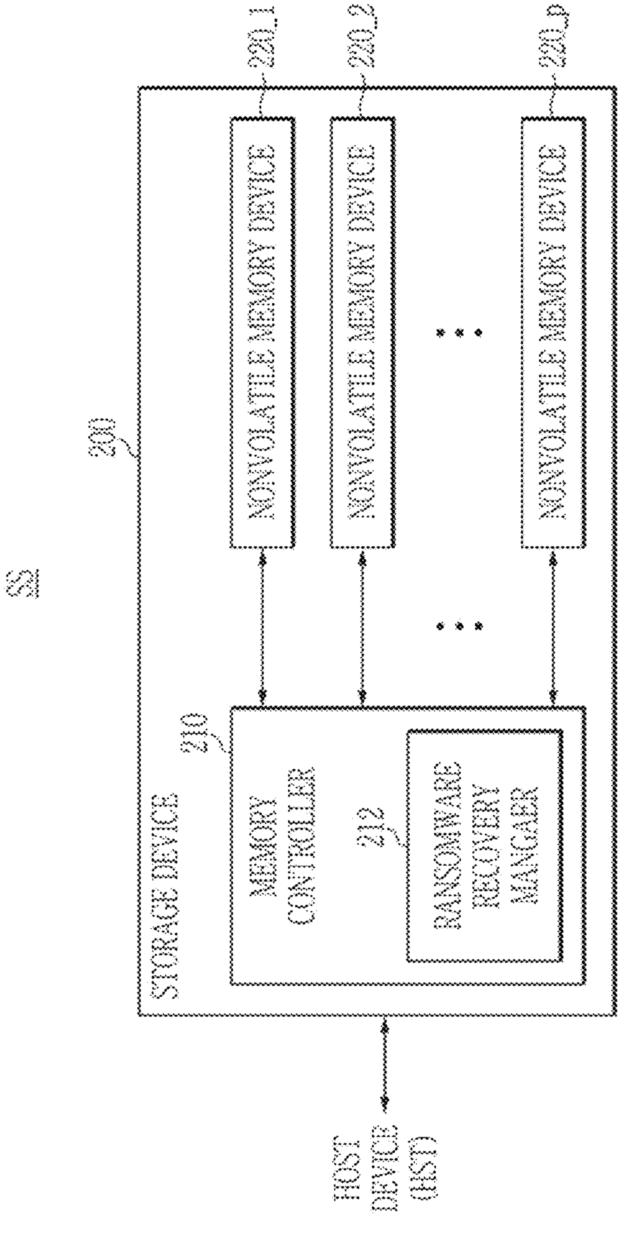
FIG. 26 is a block diagram that shows a storage system according to an embodiment.

FIG. 26 is a block diagram that shows a storage system according to an embodiment. A storage system SS may include a host device HST and a storage device 200. The storage device 200 may include a memory controller 210 and a first to p-th non-volatile memory devices 220_1 to 220_$p$. Functions of the host device HST, the memory controller 210, and the non-volatile memory devices 220 are similar to those of the host device HST, the memory controller 210, and the non-volatile memory device 120 described previously with reference to FIG. 1 to FIG. 25, no further description will be provided.

In an embodiment, the host device HST may be infected with ransomware. In this case, the host device HST may falsify raw data stored in the first to p-th non-volatile memory devices 220_1 to 220_$p$ regardless of the intention of the legitimate user of the host device HST.

The memory controller 210 may include a ransomware recovery manager 212. The ransomware recovery manager 212 may identify decoy data generated by a ransomware attack on the first to p-th non-volatile memory devices 220_1 to 220_$p$, and recover the original raw data that was falsified due to the ransomware attack.

More specifically, the ransomware recovery manager 212 may perform a ransomware recovery operation based on a plurality of stripes determined by a random combination of a plurality of memory blocks included in the first to p-th non-volatile memory devices 220_1 to 220_$p$. In other words, the plurality of stripes can include the plurality of memory blocks from any one of the first to p-th non-volatile memory devices 220_1 to 220_$p$, or from two or more of the first to p-th non-volatile memory devices 220_1 to 220_$p$. In other words, the present disclosure is not limited to a specific method of forming the stripes. The method by which the ransomware recovery manager 212 performs the ransomware recovery operation based on stripes is similar to the method described previously with reference to FIG. 1 to FIG. 25, and therefore no further detailed description will be provided.

Figure 27:
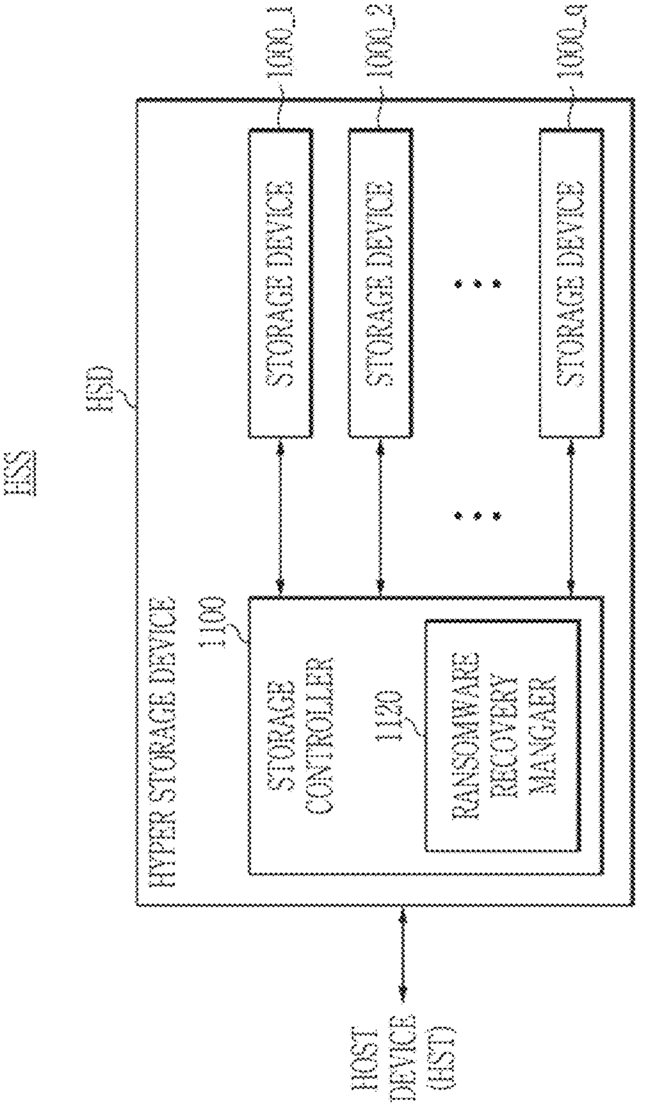
FIG. 27 is a block diagram that shows a hyper storage system according to an embodiment.

FIG. 27 is a block diagram that shows a hyper storage system according to an embodiment. A hyper storage system HSS may include a host device HST and a hyper storage device HSD. The hyper storage system HSS may include a storage controller 1100 and a first to q-th storage devices 1000_1 to 1000_$q$.

The storage controller 1100 may control the first to q-th storage devices 1000_1 to 1000_$q$ in response to a request from the host device HST. For example, the storage controller 1100 may disperse and store data provided from the host device HST to the first to q-th storage devices 1000_1 to 1000_q, or store data in one of the first to q-th storage devices 1000_1 to 1000_q.

The host device HST may access the first to q-th storage devices 1000_1 to 1000_q. For example, the host device HST may store data in the first to q-th storage devices 1000_1 to 1000_q or read data stored in the first to q-th storage devices 1000_1 to 1000_q. In this case, the host device HST may recognize the hyper storage system HSS as a storage device with a capacity corresponding to the total storage capacity of the first to q-th storage devices 1000_1 to 1000_q.

In one embodiment, the host device HST may be infected with ransomware. In this case, the host device HST may falsify raw data stored in the first to q-th storage devices 1000_1 to 1000_q regardless of the intention of the legitimate user of the host device HST.

The storage controller 1100 may include a ransomware recovery manager 1120. The ransomware recovery manager 1120 may detect a ransomware attack on the hyper storage system HSS. The ransomware recovery manager 1120 may identify decoy data generated by the ransomware attack on the first to q-th storage devices 1000_1 to 1000_q and recover raw data before being falsified due to the ransomware attack.

More specifically, the ransomware recovery manager 1120 may perform the ransomware recovery operation based on a plurality of stripes determined by a random combination of a plurality of memory blocks included in the first to q-th storage devices 1000_1 to 1000_q. In other words, a plurality of stripes includes a plurality of memory blocks included in any one of the first to q-th storage devices 1000_1 to 1000_q, or includes a plurality of memory blocks included in two or more of the first to q-th storage devices 1000_1 to 1000_q. In other words, the present disclosure is not limited to a method of forming the stripe. A method in which the ransomware recovery manager 1120 performs the ransomware recovery operation based on the stripe is similar to the method previously described with reference to FIG. 1 to FIG. 25, and therefore no further description will be provided.

The contents described above are specific embodiments for implementing present disclosure. Therefore, the scope of the present disclosure should not be limited to the above-described embodiments.

What is claimed is:

1. A storage device comprising:

a non-volatile memory device that includes a first stripe including a victim memory block and a plurality of striping memory blocks associated with the victim memory block, and a second stripe including a decoy memory block; and a memory controller configured to:

identify a victim page within the victim memory block based on physical address history information stored in a decoy data of a decoy page within the decoy memory block;

generate recovery data based on a plurality of striping pages, respectively included in the plurality of striping memory blocks, wherein the plurality of striping pages corresponds to the victim page; and program the recovery data into the victim page, wherein the physical address history information comprises a physical address corresponding to an original data of the victim page, and wherein the physical address history information is stored in the decoy memory block in response to an update request for the original data.

2. The storage device of claim 1, wherein:

the physical address history information is included in a meta region in the decoy page, wherein the meta region is not accessible by an external host device.

3. The storage device of claim 2, wherein:

the physical address history information comprises a physical page number of the victim page.

4. The storage device of claim 1, wherein the memory controller comprises:

a recovery coding module configured to generate the recovery data by performing a recovery decoding operation based on a plurality of striping data respectively stored in the plurality of striping pages.

5. The storage device of claim 4, wherein the recovery coding module is configured to:

generate the recovery data by performing an XOR operation for bits included in the same bit position of each of the plurality of striping data.

6. The storage device of claim 1, wherein the plurality of striping memory blocks comprises:

a first plurality of data memory blocks respectively storing a first plurality of raw data; and a first parity memory block including first parity data for a victim data stored in the victim page and the plurality of first raw data.

7. The storage device of claim 6, wherein:

each of the victim memory block and the plurality of striping memory blocks is included in a different superblock.

8. The storage device of claim 6, wherein:

each of the victim memory block and the plurality of striping memory blocks is included in the same plane.

9. The storage device of claim 6, wherein:

the plurality of striping memory blocks further comprise a second parity memory block configured to store second parity data for the victim data and the plurality of first raw data, and the victim memory block is included in the same superblock as one of the plurality of striping memory blocks.

10. The storage device of claim 1, wherein:

the storage device is configured to generate the recovery data when the victim page is in a free state.

11. The storage device of claim 1, wherein the memory controller further comprises:

a ransomware detect module configured to detect a ransomware attack on the victim page.

12. The storage device of claim 1, wherein a position of the victim page in the victim memory block corresponds to:

a position of each of the plurality of striping pages in the plurality of striping memory blocks.

13. An operation method of a memory controller configured to control a non-volatile memory device, comprising:

detecting a ransomware attack on the non-volatile memory device;

identifying a victim memory block subject to the ransomware attack based on physical address history information included in a decoy data, which is generated by the ransomware attack;

determining whether a garbage collection has been performed on the victim memory block after the ransomware attack;

recovering the victim memory block by validating invalid data stored in the victim memory block when the garbage collection has not been performed after the ransomware attack; and recovering the victim memory block by performing a recovery decoding based on a first stripe that includes the victim memory block when the garbage collection has been performed after the ransomware attack, and wherein the physical address history information included in the decoy data indicates a physical address of a raw data previously stored in the victim memory block, and the physical address history information is stored in a decoy memory block with the decoy data stored in the victim memory block in response to the ransomware attack.

14. The operation method of claim 13, wherein the determining comprises:

determining that the garbage collection has been performed, when a first victim page in the victim memory block, as indicated by the physical address history information, is in a free state; and determining that the garbage collection has not been performed, when the first victim page is not in the free state.

15. The operation method of claim 14, wherein the recovering the victim memory block by validating invalid data comprises:

invalidating a first mapping between a first decoy page included in the decoy memory block and a first logical address; and validating a second mapping between the first victim page and the first logical address.

16. The operation method of claim 14, wherein the recovering the victim memory block by performing the recovery decoding comprises:

generating first recovery data by performing the recovery decoding based on a plurality of striping pages, which correspond to the first victim page, included in the first stripe;

programming the first recovery data in the first victim page;

invalidating a first mapping between a first decoy page included in the decoy memory block and a first logical address; and validating a second mapping between the first victim page and a second logical address.

17. A storage device comprising:

a plurality of data memory blocks including a victim memory block;

a first parity memory block configured to store first parity data generated based on a plurality of raw data respectively stored in the plurality of data memory blocks at a first time point when each of the plurality of data memory blocks is in a fully-occupied state;

a decoy memory block configured to store decoy data generated based on first raw data stored in the victim memory block at a second time point after the first time point, wherein the first raw data is one of the plurality of raw data; and a memory controller configured to identify the victim memory block from among the plurality of data memory blocks and generate, in response to the victim memory block being erased at a third time point after the second time point, first recovery data corresponding to the first raw data based on the first parity data and the plurality of raw data excluding the first raw data, at a fourth time point after the third time point, wherein:

the decoy memory block further stores physical address history information indicating a physical address where the first raw data is stored at the second time point, and the memory controller is further configured to identify the victim memory block from among the plurality of data memory blocks based on the physical address history information.

18. The storage device of claim 17, wherein:

the plurality of data memory blocks and the first parity memory block are included in the same plane.

* * * * *